United States Patent
Shirai et al.

(10) Patent No.: US 10,782,624 B2
(45) Date of Patent: Sep. 22, 2020

(54) BINDER RESIN COMPOSITION FOR ELECTROSTATIC IMAGE DEVELOPING TONERS

(71) Applicant: KAO CORPORATION, Tokyo (JP)

(72) Inventors: Eiji Shirai, Wakayama (JP); Tomohide Yoshida, Wakayama (JP)

(73) Assignee: KAO CORPORATION, Tokyo (JP)

(*) Notice: Subject to any disclaimer, the term of this patent is extended or adjusted under 35 U.S.C. 154(b) by 0 days.

(21) Appl. No.: 16/318,525

(22) PCT Filed: Jul. 18, 2017

(86) PCT No.: PCT/JP2017/025920
§ 371 (c)(1),
(2) Date: Jan. 17, 2019

(87) PCT Pub. No.: WO2018/016479
PCT Pub. Date: Jan. 25, 2018

(65) Prior Publication Data
US 2019/0317416 A1     Oct. 17, 2019

(30) Foreign Application Priority Data

Jul. 21, 2016   (JP) ................................ 2016-143641

(51) Int. Cl.
| G03G 9/087 | (2006.01) |
| C08L 25/14 | (2006.01) |
| C08L 67/02 | (2006.01) |
| G03G 9/08 | (2006.01) |
| G03G 15/08 | (2006.01) |

(52) U.S. Cl.
CPC .......... *G03G 9/08704* (2013.01); *C08L 25/14* (2013.01); *C08L 67/02* (2013.01); *G03G 9/081* (2013.01); *G03G 9/0819* (2013.01); *G03G 9/08711* (2013.01); *G03G 9/08755* (2013.01); *G03G 15/08* (2013.01)

(58) Field of Classification Search
CPC ....................... G03G 9/08782; G03G 9/08788
See application file for complete search history.

(56) References Cited

U.S. PATENT DOCUMENTS

| 5,428,435 A | 6/1995 | Yasuda et al. | |
| 2004/0044108 A1* | 3/2004 | Agur ...................... | C08L 91/06 524/277 |
| 2005/0137278 A1 | 6/2005 | Fromm et al. | |
| 2007/0072105 A1 | 3/2007 | Fromm et al. | |
| 2008/0153018 A1 | 6/2008 | Mikuriya et al. | |
| 2008/0318148 A1 | 12/2008 | Sugimoto et al. | |
| 2009/0142094 A1* | 6/2009 | Sawada ................ | G03G 9/0806 399/111 |

FOREIGN PATENT DOCUMENTS

| JP | 5-197190 A | 8/1993 | |
| JP | 10-87839 A | 4/1998 | |
| JP | 2003-149851 A | 5/2003 | |
| JP | 2005-182041 A | 7/2005 | |
| JP | 2008-158276 A | 7/2008 | |
| JP | 2009-3024 A | 1/2009 | |
| JP | 2009-139844 A * | 6/2009 | ............. G03G 9/087 |
| JP | 2009-139844 A | 6/2009 | |
| JP | 2012-88345 A | 5/2012 | |
| WO | WO 2016/186129 A1 | 11/2016 | |

OTHER PUBLICATIONS

Translation of JP 2009-139844.*
International Search Report dated Sep. 19, 2017 in PCT/JP2017/025920 filed on Jul. 18, 2017.

* cited by examiner

*Primary Examiner* — Peter L Vajda
(74) *Attorney, Agent, or Firm* — Oblon, McClelland, Maier & Neustadt, L.L.P.

(57) ABSTRACT

The present invention relates to a binder resin composition for toners for development of electrostatic images capable of giving a toner excellent in fusing properties on PP films, a toner for development of electrostatic images containing the binder resin composition, a printing method using the toner, and a printed material. [1] A binder resin composition for toners for development of electrostatic images, including a polyester-based resin and polyolefin particles, wherein the polyolefin particles contain a polymer having a polymer skeleton of olefin having 2 or more and 3 or less carbon atoms, the volume median diameter ($D_{50}$) of a small particle size component, as measured according to a dynamic light scattering method using a dispersion S of a small particle size component obtainable according to Methods 1 and 2, is 20 nm or more and 400 nm or less, the content of a large particle size component obtainable according to Method 2 is 0% by mass or more and 30% by mass or less relative to the total amount of the large particle size component and the small particle size component, and the content of the small particle size component is 70% by mass or more and 100% by mass or less relative to the total amount of the large particle size component and the small particle size component, and the melting endothermic energy amount of the small particle size component is 3 J/g or more and 10 J/g or less; [2] a toner for development of electrostatic images including the binder resin composition for toners for development of electrostatic images according to the above [1] in an amount of 20% by mass or more and 100% by mass or less in the binder resin therein, and including a releasing agent having a melting point of 60° C. or higher and 100° C. or lower in an amount of 1 part by mass or more and 10 parts by mass or less relative to 100 parts by mass of the binder resin; [3] a printing method including printing on a plastic film according to an electrophotographic method with the toner for development of electrostatic images according to the above [2]; and [4] a printed material obtainable according to the method of the above [3].

10 Claims, No Drawings

BINDER RESIN COMPOSITION FOR ELECTROSTATIC IMAGE DEVELOPING TONERS

FIELD OF THE INVENTION

The present invention relates to a binder resin composition for toners for development of electrostatic images, a toner for development of electrostatic images, a printing method, and a printed material.

BACKGROUND OF THE INVENTION

In the field of electrophotography, with the progress of electrophotographic systems, it has been demanded to develop toners for development of electrostatic images which are adaptable for high image quality and high copying or printing speed.

On the other hand, owing to the diversification of printing media, there now occurs a demand for electrophotographic printing technologies using media other than paper media. One of the main media is a polypropylene (PP) film which has been used for labels of PET bottles, various packages or the like.

For example, Patent Literature 1 discloses a toner for development of electrostatic images which is constituted of toner particles that contain at least a binder resin containing a graft copolymer obtained by graft-copolymerizing a polyester resin with a polymerizable vinyl monomer, a wax and a specific wax stabilizer.

In addition, Patent Literature 2 discloses a binder obtained by mixing a mixture (a) of raw material monomers to be subjected to two polymerization reaction systems having respective reaction paths that are independent of each other, a compound (b) capable of reacting with both of the raw material monomers to be subjected to the two polymerization reaction systems, and a releasing agent (c), and subjecting the resulting mixture to the two polymerization reactions in a common reaction vessel.

CITATION LIST

Patent Literature

Patent Literature 1: JP 2012-88345A
Patent Literature 2: JP 10-87839A

SUMMARY OF THE INVENTION

The present invention relates to the following aspects [1] to [4].

[1] A binder resin composition for toners for development of electrostatic images, including a polyester-based resin and polyolefin particles, wherein:

the polyolefin particles contain a polymer having a polymer skeleton of olefin having 2 or more and 3 or less carbon atoms, the volume median diameter ($D_{50}$) of a small particle size component, as measured according to a dynamic light scattering method using a dispersion S of a small particle size component obtainable according to the following Methods 1 and 2, is 20 nm or more and 400 nm or less, the content of a large particle size component obtainable according to Method 2 is 0% by mass or more and 30% by mass or less relative to the total amount of the large particle size component and the small particle size component, the content of the small particle size component is 70% by mass or more and 100% by mass or less relative to the total amount of the large particle size component and the small particle size component, and the melting endothermic energy amount of the small particle size component is 3 J/g or more and 10 J/g or less, Method 1: 1 part by mass of the binder resin composition and 30 parts by mass of methyl ethyl ketone are stirred for 1 hour to prepare a dispersion H; and Method 2: after stirring to prepare the dispersion H according to Method 1, the dispersion is allowed to stand for 24 hours to precipitate a large particle size component, and the resulting supernatant solution is separated therefrom, thereby obtaining a dispersion S of the small particle size component.

[2] A toner for development of electrostatic images, including the binder resin composition for toners for development of electrostatic images according to the above [1] in an amount of 20% by mass or more and 100% by mass or less in the binder resin therein, and including a release agent having a melting point of 60° C. or higher and 100° C. or lower in an amount of 1 part by mass or more and 10 parts by mass or less relative to 100 parts by mass of the binder resin.

[3] A printing method, including printing on a plastic film according to an electrophotographic method with the toner for development of electrostatic images according to the above [2].

[4] A printed material, which is obtainable according to the method of the above [3].

DETAILED DESCRIPTION OF THE INVENTION

However, it has been supposed that these conventionally developed toners are basically applied to a paper as a printing medium. The paper is quite different in characteristics as the printing medium such as polarity or surface conditions of the material from those of polypropylene. For this reason, the conventionally developed toners have such a problem that they are hardly fused onto a polypropylene (hereinafter also referred to merely as "PP") film.

The present invention relates to a binder resin composition for toners for development of electrostatic images, which is capable of giving a toner excellent in fusing properties on PP films, a toner for development of electrostatic images, which contains the binder resin composition, a printing method using the same, and a printed material thereof.

The present inventors have found that, relative to the polyolefin particles contained in a binder resin composition, when the content of a small particle size component therein falls within a predetermined range and when the melting endothermic energy amount of the small particle size component falls within a predetermined range, a toner excellent in fusing properties on PP films can be obtained.

Specifically, the present invention relates to the following aspects [1] to [4].

[1] A binder resin composition for toners for development of electrostatic images, including a polyester-based resin and polyolefin particles, wherein:

the polyolefin particles contain a polymer having a polymer skeleton of olefin having 2 or more and 3 or less carbon atoms, the volume median diameter ($D_{50}$) of a small particle size component, as measured according to a dynamic light scattering method using a dispersion S of a small particle size component obtainable according to the following Methods 1 and 2, is 20 nm or more and 400 nm or less, the content of a large particle size component obtainable according to Method 2 is 0% by mass or more and 30% by mass or less relative to the total amount of the large particle size component and the small particle size component, the content of the small particle size component is 70% by mass or more and 100% by mass or less relative to the total amount of the large particle size component and the small particle size component, and the melting endothermic energy amount of the small particle size component is 3 J/g or more and 10 J/g or less, Method 1: 1 part by mass of the binder resin composition and 30 parts by mass of methyl ethyl ketone are stirred for 1 hour to prepare a dispersion H; and Method 2: after stirring to prepare the dispersion H according to Method 1, the dispersion is allowed to stand for 24 hours to precipitate a large particle size component, and the resulting supernatant solution is separated therefrom, thereby obtaining a dispersion S of the small particle size component.

[2] A toner for development of electrostatic images, including the binder resin composition for toners for development of electrostatic images according to the above [1] in an amount of 20% by mass or more and 100% by mass or less in the binder resin therein, and including a releasing agent having a melting point of 60° C. or higher and 100° C. or lower in an amount of 1 part by mass or more and 10 parts by mass or less relative to 100 parts by mass of the binder resin.

[3] A printing method, including printing on a plastic film according to an electrophotographic method with the toner for development of electrostatic images according to the above [2].

[4] A printed material, which is obtainable according to the method of the above [3].

In accordance with the present invention, there are provided a binder resin composition for toners for development of electrostatic images, which is capable of giving a toner excellent in fusing properties on PP films, a toner for development of electrostatic images, which contains the binder resin composition, a printing method using the same, and a printed material thereof.

Moreover, in accordance with the present invention, there are provided a binder resin composition for toners for development of electrostatic images, which is capable of giving a toner also excellent in fusing properties on paper, and a toner for development of electrostatic images, which contains the binder resin composition, in addition to the above-mentioned effects.

[Binder Resin Composition]

The binder resin composition for toners for development of electrostatic images of the present invention includes a polyester-based resin and polyolefin particles.

In the present invention, the polyolefin particles contain a polymer having a polymer skeleton of olefin having 2 or more and 3 or less carbon atoms.

In the present invention, the polyolefin particles are, from the viewpoint of obtaining a toner excellent in fusing properties on PP films, preferably such that the volume median diameter ($D_{50}$) of the small particle size component therein, as measured according to a dynamic light scattering method using a dispersion S of the small particle size component obtainable according to the following Methods 1 and 2, is 20 nm or more and 400 nm or less, the content of the large particle size component therein obtainable according to Method 2 is 0% by mass or more and 30% by mass or less relative to the total amount of the large particle size component and the small particle size component, the content of the small particle size component is 70% by mass or more and 100% by mass or less relative to the total amount of the large particle size component and the small particle size component, and the melting endothermic energy amount of the small particle size component is 3 J/g or more and 10 J/g or less, Method 1: 1 part by mass of the binder resin composition and 30 parts by mass of methyl ethyl ketone are stirred for 1 hour to prepare a dispersion H; and Method 2: after stirring to prepare the dispersion H according to Method 1, the dispersion is allowed to stand for 24 hours to precipitate a large particle size component, and the resulting supernatant solution is separated therefrom, thereby obtaining a dispersion S of the small particle size component.

In accordance with the present invention, there are provided a binder resin composition for toners for development of electrostatic images, which is capable of giving a toner excellent in fusing properties on PP film, a toner for development of electrostatic images, which contains the binder resin composition, a printing method using the same, and a printed material thereof. Though not clear, the reason may be considered to be as follows.

The present inventors have noticed the particle size of polyolefin particles such as polyolefin wax in the binder resin composition.

When mixing the binder resin composition with methyl ethyl ketone and stirring the resulting mixture for 1 hour, the polyester-based resin contained in the binder resin composition is dissolved in methyl ethyl ketone, so that it is possible to obtain a dispersion H well reflecting the particle size of the polyolefin particles contained in the binder resin composition. When allowing the dispersion H to stand for 24 hours to precipitate a large particle size component of the polyolefin particles and thereby separate a small particle size component of the polyolefin particles only from the dispersion H, the volume median diameter of the small particle size component of the polyolefin particles as observed falls within the range of 20 nm or more and 400 nm or less. Besides, when measuring the endothermic energy amount of the small particle size component of the polyolefin particles, the melting endothermic energy amount thereof was found to be a small value.

Accordingly, when polyolefin particles having a particle size falling within a predetermined range are contained in the binder resin composition, these polyolefin particles could rapidly melt in a fusing step in a printing process according to an electrophotographic method since these polyolefin particles are small particles and have a small melting endothermic energy amount, and are therefore considered to contribute toward wet-spreading fusing on a nonpolar printing medium such as a polyolefin medium.

On the other hand, the binder resin composition of the present invention exhibits excellent fusing properties on paper not detracting from the fusing properties on paper that a polyester-based resin has.

In the present invention, "polyolefin particles" are included in the subordinate concept of a binder resin.

Namely, in the present invention, a binder resin is meant to include both a polyester-based resin and polyolefin particles, and for example, in the wording of "100 parts by mass of a binder resin", the mass of the binder resin includes the mass of a polyester-based resin and the mass of polyolefin particles.

<Polyolefin Particles>

In the binder resin composition, the polyolefin particles are preferably dispersed in the polyester-based resin.

The content of the small particle size component and that of the large particle size component in the polyolefin particles can be determined according to the following Methods 1 and 2.

Method 1: 1 part by mass of the binder resin composition and 30 parts by mass of methyl ethyl ketone are stirred for 1 hour to prepare a dispersion H.

Method 2: after stirring to prepare the dispersion H according to Method 1, the dispersion is allowed to stand for 24 hours to precipitate a large particle size component, and the resulting supernatant solution separated therefrom, thereby obtaining a dispersion S of a small particle size component.

The binder resin composition is a binder resin composition including a polyester-based resin and polyolefin particles. Regarding the detailed conditions for Methods 1 and 2, the methods described in the section of Examples may be referred to. Regarding the methods for measuring the volume median diameter, the content and the melting endothermic energy amount of the small particle size component and the large particle size component mentioned below, the methods described in the section of Examples shall be referred to.

The volume median diameter ($D_{50}$) of the small particle size component (hereinunder this may be simply referred to as "volume median diameter of the small particle size component"), as measured according to a dynamic light scattering method using the dispersion S of the small particle size component obtainable according to Methods 1 and 2, is 20 nm or more and 400 nm or less.

The volume median diameter of the small particle size component is 20 nm or more, preferably 60 nm or more, more preferably 100 nm or more, even more preferably 120 nm or more, and is 400 nm or less, preferably 300 nm or less, more preferably 250 nm or less, even more preferably 200 nm or less, and further more preferably 160 nm or less, from the viewpoint of providing a toner excellent in fusing properties on paper and in fusing properties on PP films.

The melting endothermic energy amount of the small particle size component is 3 J/g or more and 10 J/g or less, preferably 3.5 J/g or more, more preferably 4.0 J/g or more, even more preferably 4.5 J/g or more, and is preferably 9.5 J/g or less, more preferably 9.0 J/g or less, even more preferably 8.0 J/g or less, still more preferably 7.0 J/g or less, and further more preferably 6.5 J/g or less, from the viewpoint of providing a toner excellent in fusing properties on PP films.

The melting endothermic energy amount of the small particle size component can be controlled to fall within the above-mentioned range by controlling the resin particle size of the polyolefin particles and the molecular weight of the polyolefin.

The content of the small particle size component is, from the viewpoint of providing a toner excellent in fusing properties on paper and in fusing properties on PP films, 70% by mass or more and 100% by mass or less relative to the total amount of the large particle size component and the small particle size component.

The content of the small particle size component is, from the viewpoint of improving the fusing properties on paper and the fusing properties on PP films, 70% by mass or more, preferably 75% by mass or more, more preferably 80% by mass or more, even more preferably 85% by mass or more, still more preferably 90% by mass or more, and is 100% by mass or less, preferably less than 100% by mass, and more preferably 99% by mass or less, relative to the total amount of the large particle size component and the small particle size component.

The content of the small particle size component can be controlled to fall within the above-mentioned range by enhancing the dispersion condition of the polyolefin particles.

The content of the small particle size component of the polyolefin particles in the binder resin in toner is preferably 1.0% by mass or more, more preferably 1.5% by mass or more, even more preferably 2.0% by mass or more, further more preferably 2.5% by mass or more, and is preferably 54% by mass or less, more preferably 40% by mass or less, even more preferably 30% by mass or less, still more preferably 20% by mass or less, and further more preferably 10% by mass or less, from the viewpoint of realizing excellent fusing properties on PP films.

The volume median diameter ($D_{50}$) of the large particle size component in the polyolefin particles (hereinafter this may be simply referred to as "volume median diameter of large particle size component") is preferably 1 μm or more, more preferably 3 μm or more, even more preferably 5 μm or more, still more preferably 8 μm or more, and is preferably 50 μm or less, more preferably 40 μm or less, even more preferably 35 μm or less, still more preferably 30 μm or less, further more preferably 25 μm or less, and still further more preferably 20 μm or less.

The melting endothermic energy amount of the large particle size component is preferably 40 J/g or more, more preferably 45 J/g or more, even more preferably 50 J/g or more, further more preferably 55 J/g or more, and is preferably 150 J/g or less, more preferably 130 J/g or less, even more preferably 110 J/g or less, still more preferably 90 J/g or less, and further more preferably 70 J/g or less, from the viewpoint of providing a toner excellent in fusing properties on PP films.

The melting endothermic energy amount of the large particle size component may be controlled to fall within the above-mentioned range by controlling the molecular weight of the polyolefin.

The ratio of the melting endothermic energy amount of the small particle size component to the melting endothermic energy amount of the large particle size component [small particle size component/large particle size component] is preferably 0.160 or less, more preferably 0.150 or less, even more preferably 0.130 or less, still more preferably 0.120 or less, further more preferably 0.110 or less, and is preferably 0.01 or more, more preferably 0.03 or more, even more preferably 0.05 or more, from the viewpoint of providing a toner excellent in fusing properties on PP films.

The content of the large particle size component in the polyolefin particles is, from the viewpoint of providing a toner excellent in fusing properties on paper and in fusing properties on PP films, 0% by mass or more and 30% by mass or less relative to the total amount of the large particle size component and the small particle size component.

The content of the large particle size component in the polyolefin particles is 0% by mass or more, preferably more than 0% by mass, even more preferably 1% by mass or more, and is 30% by mass or less, preferably 25% by mass or less, even more preferably 20% by mass or less, still more preferably 15% by mass or less, and further more preferably 10% by mass or less, relative to the total amount of the large particle size component and the small particle size component, from the viewpoint of enhancing the fusing properties on paper and the fusing properties on PP films.

The polyolefin particles contain a polymer having a polymer skeleton of olefin having 2 or more and 3 or less carbon atoms (hereinafter this may be simply referred to as "polyolefin").

Examples of the polymer having a polymer skeleton of olefin having 2 or more and 3 or less carbon atoms include a polymer having a polypropylene skeleton or a polyethylene skeleton. Here, the polymer having a polyethylene skeleton is meant to include not only a synthetic polyethylene polymer but also a compound having the same chemical structure as that of polyethylene such as paraffins.

The content of the polymer skeleton of olefin having 2 or more and 3 or less carbon atoms is preferably 70% by mass or more in the polymer, more preferably 80% by mass or more, even more preferably 90% by mass or more, and is 100% by mass or less.

Examples of the polyolefin include polypropylene, polyethylene, paraffin, polypropylene ethylene copolymer. Among these, a polymer having a polypropylene skeleton is preferred, and polypropylene is more preferred.

Examples of the polyolefin include, though not specifically limited thereto, polyolefins or derivatives of those polyolefins that are obtainable according to an ordinary method of producing them through olefin polymerization, a method of producing them by thermal decomposition of polyolefins used for containers for ordinary molding, and a method of producing them by separation and purification of a low-molecular weight polyolefin that is produced as a side product in production of polyolefins for use for containers for ordinary molding.

Examples of polyolefin derivatives include polyolefin oxides, that is, polyolefin oxides produced by adding a carboxy group or a hydroxy group to the polyolefin skeleton according to a method of air oxidation, as well as modified derivatives produced through maleic acid modification, fumaric acid modification, itaconic acid modification or styrene modification. Among these, at least one selected from polyolefins and maleic acid-modified polyolefins is preferred, and a polyolefin, that is, an unmodified polyolefin is more preferred.

The melting point of the polyolefin is preferably 90° C. or higher, more preferably 100° C. or higher, even more preferably 110° C. or higher, and is preferably 170° C. or lower, more preferably 160° C. or lower, even more preferably 150° C. or lower, still more preferably 140° C. or lower, and further more preferably 138° C. or lower, from the viewpoint of excellent fusing properties on PP films.

The acid value of the polyolefin is preferably 70 mgKOH/g or less, more preferably 30 mgKOH/g or less, even more preferably 10 mgKOH/g or less, still more preferably 2 mgKOH/g or less, and is preferably 0 mgKOH/g or more, more preferably 0 mgKOH/g, from the viewpoint of excellent fusing properties on PP films.

The hydroxyl value of the polyolefin is preferably 70 mgKOH/g or less, more preferably 30 mgKOH/g or less, even more preferably 10 mgKOH/g or less, and is preferably 0 mgKOH/g or more, more preferably 0 mgKOH/g, from the viewpoint of excellent fusing properties on PP films.

The details of the measurement method will be described in the section of Examples given hereunder.

The viscosity-average molecular weight of the polyolefin is preferably 300 or more, more preferably 500 or more, more preferably 700 or more, more preferably 1,000 or more, more preferably 2,000 or more, more preferably 4,000 or more, more preferably 6,000 or more, and is preferably 50,000 or less, more preferably 30,000 or less, more preferably 15,000 or less, more preferably 10,000 or less, more preferably 8,000 or less, from the viewpoint of excellent fusing properties on PP films.

The content of the polyolefin particles in the binder resin composition is preferably 1% by mass or more, more preferably 3% by mass or more, more preferably 5% by mass or more, more preferably 7% by mass or more, and is, from the viewpoint of fusing properties on paper, preferably 60% by mass or less, more preferably 40% by mass or less, more preferably 25% by mass or less and more preferably 15% by mass or less, relative to the binder resin, from the viewpoint of fusing properties on PP films.

The content of the polyolefin particles in the binder resin composition is preferably 1 part by mass or more relative to 100 parts by mass of the polyester-based resin in the composition, more preferably 3 parts by mass or more, more preferably 5 parts by mass or more, more preferably 7 parts by mass or more, and is, from the viewpoint of fusing properties on paper, preferably 60 parts by mass or less, more preferably 40 parts by mass or less, more preferably 30 parts by mass or less, more preferably 25 parts by mass or less, and more preferably 15 parts by mass or less, from the viewpoint of fusing properties on PP films.

The binder resin composition of the present invention includes polyolefin particles from the viewpoint of giving a toner excellent in fusing properties on paper and in fusing properties on PP films. As the polyolefin, a known polyolefin wax may be used. Within a range not detracting from the advantageous effects of the present invention, any known polyolefin wax and polyester wax may be used in the composition.

The constituent components of the binder resin composition of the present invention are described in detail hereinunder.

<Polyester-Based Resin>

The polyester-based resin used in the present invention is not particularly limited as long as it is in the form of a polyester-based resin containing at least a polyester moiety formed by polycondensation of an alcohol component and a carboxylic acid component.

Examples of the polyester-based resin include a polyester resin formed of a polyester moiety, and a composite resin containing a polyester resin segment (A) and a vinyl resin segment (B).

The polyester-based resin is preferably an amorphous polyester-based resin.

"Amorphous resin" means a resin whose crystallinity index value, as defined by a ratio of the softening point (° C.) to the highest endothermic peak temperature (° C.) according to differential scanning calorimetry (DSC), that is, [(softening point)/(highest endothermic peak temperature)], is 1.4 or more or less than 0.6. The highest endothermic peak temperature indicates the temperature of the peak on the highest temperature side among the endothermic peaks detected under the condition of the measurement method described in the section of Examples.

<<Alcohol Component>>

Examples of the alcohol component include an aliphatic diol, an aromatic diol and a trivalent or higher-valent polyhydric alcohol. These alcohol components may be used alone or in combination of any two or more thereof.

The alcohol component preferably includes an alkylene-oxide adduct of bisphenol A represented by the following formula (I) from the viewpoint of improving the fusing properties of the resulting toner on PP films.

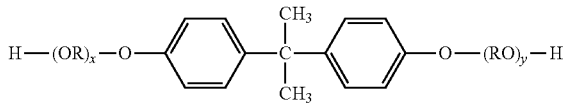

(I)

In the formula, R is an alkylene group having 2 or 3 carbon atoms; and x and y are respectively a positive number representing an average molar number of addition of an alkyleneoxide, and a sum of x and y is preferably 1 or more, more preferably 1.5 or more and even more preferably 2 or more, and is also preferably 16 or less, more preferably 5 or less and even more preferably 3 or less.

Examples of the alkyleneoxide adduct of bisphenol A represented by the aforementioned formula (I) include a polyoxypropylene adduct of 2,2-bis(4-hydroxyphenyl)propane and a polyoxyethylene adduct of 2,2-bis(4-hydroxyphenyl)propane.

The content of the polyoxypropylene adduct of 2,2-bis (4-hydroxyphenyl)propane in the alcohol component as a raw material monomer of the polyester-based resin is preferably 50 mol % or more, more preferably 60 mol % or more and even more preferably 65 mol % or more, and is also preferably 100 mol % or less, more preferably 95 mol % or less, even more preferably 85 mol % or less, and further even more preferably 75 mol % or less, from the viewpoint of improving the fusing properties of the resulting toner on PP films.

The content of the alkyleneoxide adduct of bisphenol A represented by the aforementioned formula (I) in the alcohol component as a raw material monomer of the polyester-based resin is preferably 80 mol % or more, more preferably 85 mol % or more and even more preferably 90 mol % or more, and is also 100 mol % or less, and furthermore preferably 100 mol %, from the viewpoint of improving the fusing properties of the resulting toner on PP films.

In addition, the alcohol component may also contain, for example, an aliphatic diol having 2 or more and 20 or less carbon atoms or a trivalent or higher-valent polyhydric alcohol such as glycerin, etc. Examples of the aliphatic diols include ethylene glycol, 1,2-propanediol, 1,3-propanediol, 1,4-butanediol, 1,5-pentanediol, 1,6-hexanediol, 1,4-butenediol, 1,3-butanediol, neopentyl glycol, 1,10-decanediol and 1,12-dodecanediol. Among these aliphatic diols, preferred is 1,2-propanediol.

<<Carboxylic Acid Component>>

Examples of the carboxylic acid component include an aliphatic dicarboxylic acid, an aromatic dicarboxylic acid and a trivalent or higher-valent polycarboxylic acid, as well as an anhydride and an alkyl (having 1 or more and 3 or less carbon atoms) ester of these acids. These carboxylic acid components may be used alone or in combination of any two or more kinds thereof.

The number of carbon atoms contained in a main chain of the aliphatic dicarboxylic acid is preferably 4 or more, and is also preferably 16 or less, more preferably 14 or less, even more preferably 10 or less, further even more preferably 8 or less and still further even more preferably 6 or less, from the viewpoint of improving the fusing properties of the resulting toner on PP films.

Specific examples of the aliphatic dicarboxylic acid include oxalic acid, malonic acid, maleic acid, fumaric acid, citraconic acid, itaconic acid, glutaconic acid, succinic acid, adipic acid, suberic acid, azelaic acid, sebacic acid and dodecanedioic acid, as well as succinic acid substituted with an alkyl group having 1 or more and 20 or less carbon atoms or an alkenyl group having 2 or more and 20 or less carbon atoms such as dodecylsuccinic acid, dodecenylsuccinic acid and octenylsuccinic acid. Of these aliphatic dicarboxylic acids, from the viewpoint of improving the fusing properties of the resulting toner on PP films, preferred are succinic acid, fumaric acid, dodecenylsuccinic acid and octenylsuccinic acid, and more preferred is succinic acid.

Examples of the aromatic dicarboxylic acid include terephthalic acid, phthalic acid and isophthalic acid. Of these aromatic dicarboxylic acids, from the viewpoint of improving the fusing properties of the resulting toner on PP films, preferred is terephthalic acid.

The content of the aliphatic dicarboxylic acid in the carboxylic acid component as a raw material monomer of the polyester-based resin is preferably 5 mol % or more, more preferably 10 mol % or more and even more preferably 15 mol % or more, and is also preferably 40 mol % or less, more preferably 35 mol % or less and even more preferably 30 mol % or less, from the viewpoint of improving the fusing properties of the resulting toner on PP films.

In addition, the content of the aromatic dicarboxylic acid in the carboxylic acid component as a raw material monomer of the polyester-based resin is preferably 40 mol % or more, more preferably 50 mol % or more and even more preferably 55 mol % or more, and is also preferably 95 mol % or less, more preferably 85 mol % or less and even more preferably 80 mol % or less, from the viewpoint of improving the fusing properties on PP films.

The total content of the aliphatic dicarboxylic acid and the aromatic dicarboxylic acid in the carboxylic acid component as a raw material monomer of the polyester-based resin is preferably 70 mol % or more, more preferably 75 mol % or more and even more preferably 80 mol % or more, and is also 100 mol % or less, and furthermore preferably 90 mol % or less, from the viewpoint of improving the fusing properties on PP films.

The trivalent or higher-valent polycarboxylic acid usable in the present invention is preferably a trivalent carboxylic acid. Examples of the trivalent or higher-valent polycarboxylic acid include trimellitic acid, 2,5,7-naphthalene tricarboxylic acid and pyromellitic acid. Among these, from the viewpoint of improving the fusing properties of the resulting toner on PP films, preferred is trimellitic acid.

The content of the trivalent or higher-valent polycarboxylic acid in the carboxylic acid component as a raw material monomer of the polyester-based resin is preferably 1 mol % or more, more preferably 5 mol % or more and even more preferably 8 mol % or more, and is also preferably 30 mol % or less, more preferably 20 mol % or less and even more preferably 15 mol % or less, from the viewpoint of improving the fusing properties of the resulting toner on PP films.

Of these, from the viewpoint of improving the fusing properties of the resulting toner on PP films, preferred is a combination of the aromatic dicarboxylic acid and the aliphatic dicarboxylic acid, more preferred is a combination of fumaric acid and terephthalic acid, and even more preferred is a combination of fumaric acid, terephthalic acid and trimellitic acid.

Also preferably, an aromatic dicarboxylic acid, an aliphatic dicarboxylic acid and a trivalent or higher-valent polycarboxylic acid are used in combination.

<<Molar Ratio of Carboxylic Acid Component to Alcohol Component>>

The molar ratio of the carboxylic acid component to the alcohol component [carboxylic acid component/alcohol component] is preferably 0.7 or more, more preferably 0.8 or more, even more preferably 0.9 or more, further even more preferably 1.0 or more and still further even more preferably 1.1 or more, and is also preferably 1.5 or less, more preferably 1.4 or less and even more preferably 1.3 or less, from the viewpoint of well controlling the reactivity and the properties.

Meanwhile, from the viewpoint of well controlling the properties, the alcohol component may also contain an appropriate amount of a monovalent alcohol, and the carboxylic acid component may also contain an appropriate amount of a monovalent carboxylic acid compound.

The equivalent ratio of a COOH group of the carboxylic acid component to a OH group of the alcohol component [COOH group/OH group] is preferably 0.7 or more, more preferably 0.8 or more, even more preferably 0.9 or more, further even more preferably 1.0 or more and still further even more preferably 1.1 or more, and is also preferably 1.5 or less, more preferably 1.4 or less and even more preferably 1.3 or less, from the viewpoint of well controlling the reactivity and the properties.

[Composite Resin]

The above-mentioned composite resin contains a polyester resin segment (A) and a vinyl resin segment (B).

The mass ratio of the polyester resin segment (A) to the vinyl resin segment (B) [(A)/(B)] in the composite resin is preferably 30/70 or more, more preferably 40/60 or more, even more preferably 50/50 or more, still more preferably 55/45 or more, and is also preferably 95/5 or less, more preferably 90/10 or less, even more preferably 80/20 or less, and still more preferably 70/30 or less, from the viewpoint of improving the fusing properties of the resulting toner on PP films.

Meanwhile, when calculating the aforementioned mass ratio, the value obtained by subtracting an amount of water removed upon the condensation reaction from a total amount of the raw material monomers of the polyester resin segment (A) is used as the mass of the polyester resin segment (A), whereas the total amount of the raw material monomer of the vinyl resin segment (B) and a polymerization initiator is used as the mass of the vinyl resin segment (B). In addition, the amount of a bireactive monomer that may be optionally used, if required, is calculated as being included in the mass of the polyester resin segment (A).

(Polyester Resin Segment (A))

The polyester resin constituting the polyester resin segment (A) is obtainable through polycondensation of an alcohol component and a carboxylic acid component, and preferred examples thereof are exemplified hereinabove for the above-mentioned polyester-based resin.

(Vinyl Resin Segment (B))

From the viewpoint of finely dispersing and stabilizing the polyester particles in the binder resin composition to thereby improve the fusing properties of the resulting toner on PP films, the vinyl resin segment (B) contains a constitutional unit derived from a vinyl monomer, preferably contains a constitutional unit derived from a vinyl monomer containing an aliphatic hydrocarbon group having 6 or more and 22 or less carbon atoms, and more preferably contains a constitutional unit derived from a vinyl monomer containing an aliphatic hydrocarbon group having 6 or more and 22 or less carbon atoms and a constitutional unit derived from a styrene compound. Specifically, the raw material vinyl monomer of the vinyl resin segment (B) preferably includes a vinyl monomer containing an aliphatic hydrocarbon group having 6 or more and 22 or less carbon atoms, and more preferably includes a vinyl monomer containing an aliphatic hydrocarbon group having 6 or more and 22 or less carbon atoms and a styrene compound.

The vinyl resin segment (B) having a hydrophobic long-chain aliphatic hydrocarbon group is capable of exhibiting enhanced affinity to polyolefin particles. As a result, it is considered that polyolefin particles can be well finely dispersed in the composite resin including the vinyl resin segment (B).

The vinyl monomer containing an aliphatic hydrocarbon group having 6 or more and 22 or less carbon atoms is preferably a (meth)acrylate containing an aliphatic hydrocarbon group having 6 or more and 22 or less carbon atoms.

The aliphatic hydrocarbon group may be a saturated aliphatic hydrocarbon group or an unsaturated aliphatic hydrocarbon group, but is preferably a saturated aliphatic hydrocarbon group, more preferably an alkyl group.

The number of carbon atoms contained in the aliphatic hydrocarbon group in the vinyl monomer containing an aliphatic hydrocarbon group having 6 or more and 22 or less carbon atoms is preferably 7 or more and more preferably 8 or more, and is, from the viewpoint of improving the fusing properties of the resulting toner on PP films and enhancing the transparency of the resulting printed material, preferably 10 or more, more preferably 11 or more, more preferably 13 or more, more preferably 15 or more, more preferably 17 or more, and is preferably 22 or less, more preferably 20 or less, more preferably 19 or less.

The vinyl monomer containing an aliphatic hydrocarbon group having 6 or more and 22 or less carbon atoms is preferably at least one selected from stearyl (meth)acrylate, palmityl (meth)acrylate and lauryl (meth)acrylate, more preferably at least one selected from stearyl (meth)acrylate and palmityl (meth)acrylate, and even more preferably stearyl (meth)acrylate from the viewpoint of improving the fusing properties of the resulting toner on PP films and enhancing the transparency of the resulting printed material.

As the raw material vinyl monomer of the vinyl resin segment (B), the vinyl monomer containing an aliphatic hydrocarbon group having 6 or more and 22 or less carbon atoms may be used in combination with any other vinyl monomer.

Examples of the other vinyl monomers include styrene compounds such as styrene and α-methyl styrene; vinyl monomers having an aliphatic hydrocarbon group having 1 or more and 5 or less carbon atoms; ethylenically unsaturated monoolefins such as ethylene and propylene; diolefins such as butadiene; halovinyl compounds such as vinyl chloride; vinyl esters such as vinyl acetate and vinyl propionate; ethylenic monocarboxylic acid esters such as dimethylaminoethyl (meth)acrylate; vinyl ethers such as vinyl methyl ether; vinylidene halides such as vinylidene chloride; and N-vinyl compounds such as N-vinyl pyrrolidone. Of these, from the viewpoint of reactivity, preferred are styrene compounds, and more preferred is styrene.

The content of the constitutional unit derived from the vinyl monomer containing an aliphatic hydrocarbon group having 6 or more and 22 or less carbon atoms in the vinyl resin segment (B) is preferably 8% by mass or more, more preferably 10% by mass or more, even more preferably 15% by mass or more from the viewpoint of improving the fusing properties of the resulting toner on paper and on PP films, and is also preferably 70% by mass or less, more preferably 60% by mass or less, even more preferably 50% by mass or less and further even more preferably 40% by mass or less from the viewpoint of enhancing the fusing properties on paper and on PP films.

The content of the constitutional unit derived from the styrene compound in the vinyl resin segment (B) is preferably 30% by mass or more, more preferably 40% by mass or more, more preferably 50% by mass or more, more preferably 60% by mass or more, and is also preferably 99% by mass or less, more preferably 90% by mass or less, more preferably 85% by mass or less, more preferably 80% by mass or less, from the viewpoint of improving the fusing properties of the resulting toner on PP films.

The total content of the constitutional unit derived from the vinyl monomer having an aliphatic hydrocarbon group having 6 or more and 22 or less carbon atoms and the constitutional unit derived from the styrene compound in the vinyl resin segment (B) is preferably 90% by mass or more, more preferably 95% by mass or more and even more preferably 99% by mass or more, and is also 100% by mass or less, and furthermore preferably 100% by mass, from the viewpoint of improving the fusing properties of the resulting toner on PP films.

(Bireactive Monomer)

The composite resin preferably further contains a constitutional unit derived from a bireactive monomer that can react with both monomers of the polyester resin segment (A) and the vinyl resin segment (B).

When using a bireactive monomer as a raw material monomer for the composite resin, the bireactive monomer reacts with both the polyester resin segment (A) and the vinyl resin segment (B) to produce the composite resin with good efficiency.

The composite resin is preferably one obtainable through polymerization of a raw material monomer for the polyester resin segment (A), a raw material monomer for the vinyl resin segment (B) and a bireactive monomer.

Examples of the bireactive monomer include compounds having at least one functional group selected from a carboxyl group, a hydroxy group, an epoxy group, a primary amino group and a secondary amino group, and an ethylenic unsaturated bond, in the molecule. Among these, from the viewpoint of reactivity, compounds having at least one selected form a hydroxy group and a carboxy group and an ethylenic unsaturated bond are preferred, and compounds having a carboxy group and an ethylenic unsaturated bond are more preferred.

Examples of the bireactive monomer include acrylic acid, methacrylic acid, maleic acid and maleic anhydride. As the bireactive monomer, at least one selected from alkyl acrylates and alkyl methacrylates can be used. The carbon number of the alkyl group is preferably 2 or more, more preferably 3 or more, and is preferably 6 or less, more preferably 4 or less. From the viewpoint of reactivity in polycondensation and addition polymerization, acrylic acid or methacrylic acid is preferred, and acrylic acid is more preferred.

The content molar number of the bireactive monomer-derived constitutional unit is preferably 0.001 mol/g or more, more preferably 0.005 mol/g or more, more preferably 0.007 mol/g or more, more preferably 0.009 mol/g or more, and is preferably 0.10 mol/g or less, more preferably 0.05 mol/g or less, more preferably 0.03 mol/g or less, relative to the mass of the vinyl monomer-derived constitutional unit in the composite resin, from the viewpoint of the fusing properties on PP films.

The content of the bireactive monomer-derived constitutional unit is preferably 1 part by mol or more, more preferably 5 parts by mol or more, more preferably 10 parts by mol or more, more preferably 15 parts by mol or more, more preferably 20 parts by mol or more, more preferably 30 parts by mol or more, and is preferably 70 parts by mol or less, more preferably 60 parts by mol or less, more preferably 50 parts by mol or less, relative to 100 parts by mol of the alcohol component of the raw material for the polyester resin segment (A), from the viewpoint of the fusing properties on PP films.

The content of the bireactive monomer-derived constitutional unit is preferably 0.5 parts by mass or more, more preferably 1 part by mass or more, more preferably 3 parts by mass or more, more preferably 5 parts by mass or more, more preferably 7 parts by mass or more, and is preferably 10 parts by mass or less, more preferably 9 parts by mass or less, more preferably 8.5 parts by mass or less, relative to 100 parts by mass of the vinyl monomer of the raw material for the vinyl resin segment (B), from the viewpoint of the fusing properties on PP films.

[Production Method for Polyester-Based Resin]

[Reaction Condition]

The alcohol component and the carboxylic acid component are subjected to polycondensation reaction to produce the polyester-based resin.

The polycondensation temperature is preferably 160° C. or higher, more preferably 190° C. or higher and even more preferably 200° C. or higher, and is also preferably 260° C. or lower, more preferably 250° C. or lower and even more preferably 240° C. or lower, from the viewpoint of reactivity.

<<Esterification Catalyst>>

Examples of the esterification catalyst suitably used in the polycondensation reaction include titanium compounds and tin (II) compounds containing no Sn—C bond. These titanium compounds and tin compounds as the esterification catalyst may be used alone or in combination of any two or more thereof.

The titanium compound is preferably a titanium compound having a Ti—O bond and more preferably a titanium compound containing an alkoxy group having 1 or more and 28 or less carbon atoms in total, an alkenyloxy group or an acyloxy group.

As the tin (II) compound containing no Sn—C bond, preferred are tin (II) compounds having an Sn—O bond and tin (II) compounds having an Sn—X bond wherein X represents a halogen atom, etc., and more preferred are tin (II) compounds having an Sn—O bond. Among them, in particular, from the viewpoint of well controlling the reactivity and molecular weight as well as properties of the resulting composite resin, even more preferred is tin (II) di(2-ethyl hexanoate).

The amount of the esterification catalyst used is preferably 0.01 parts by mass or more, more preferably 0.1 parts by mass or more and even more preferably 0.2 parts by mass or more, and is also preferably 1.5 parts by mass or less, more preferably 1.0 part by mass or less and even more preferably 0.6 parts by mass or less, on the basis of 100 parts by mass of a total amount of the alcohol component and the carboxylic acid component, from the viewpoint of well controlling the reactivity and molecular weight as well as properties of the resulting composite resin.

<<Esterification Promoter>>

The esterification promoter is preferably a pyrogallol compound. The pyrogallol compound is a compound containing a benzene ring in which three hydrogen atoms adjacent to each other are respectively substituted with a hydroxy group. Examples of the pyrogallol compound include pyrogallol, gallic acid, gallic acid esters, benzophenone derivatives such as 2,3,4-trihydroxybenzophenone and 2,2',3,4-tetrahydroxybenzophenone, and catechin derivatives such as epigallocatechin and epigallocatechin gallate.

Among these pyrogallol compounds, gallic acid is preferably used from the viewpoint of improving the reactivity.

The amount of the esterification promoter used is preferably 0.001 parts by mass or more, more preferably 0.005 parts by mass or more and even more preferably 0.01 parts by mass or more, and is also preferably 0.15 parts by mass or less, more preferably 0.10 parts by mass or less and even more preferably 0.05 parts by mass or less, on the basis of 100 parts by mass of a total amount of the alcohol component and the carboxylic acid component, from the viewpoint of well controlling the reactivity and molecular weight as well as properties of the resulting composite resin.

The mass ratio of the esterification promoter to the esterification catalyst (esterification promoter/esterification catalyst) is preferably 0.001 or more, more preferably 0.01 or more and even more preferably 0.02 or more, and is also preferably 0.5 or less, more preferably 0.3 or less and even more preferably 0.1 or less, from the viewpoint of improving the reactivity.

(Production Method for Composite Resin)

The composite resin is preferably produced by any of the following methods (1) to (3). Meanwhile, the bireactive monomer is preferably fed together with the raw material monomer of the vinyl resin segment (B) to the reaction system from the viewpoint of improving the reactivity. In addition, from the same viewpoint as described above, upon production of the composite resin, the catalysts such as the esterification catalyst and the esterification promoter may also be used in the reaction, and further a polymerization initiator and a polymerization inhibitor may also be used in the reaction.

(1) Method of conducting the step (X) of subjecting the alcohol component and the carboxylic acid component to polycondensation reaction, followed by conducting the step (Y) of subjecting the raw material vinyl monomer of the vinyl resin segment (B) and, if required, the bireactive monomer to addition polymerization reaction.

Meanwhile, there is more preferably used such a method in which after subjecting a part of the carboxylic acid component to the polycondensation reaction in the step (X) and then conducting the step (Y), the reaction temperature is raised again, and a remaining part of the carboxylic acid component is added to the reaction system to allow the polycondensation reaction in the step (X) and, if required, the reaction with the bireactive monomer to further proceed.

(2) Method of conducting the step (Y) of subjecting the raw material monomer of the vinyl resin segment (B) and the bireactive monomer to addition polymerization reaction, followed by conducting the step (X) of subjecting the alcohol component and the carboxylic acid component to polycondensation reaction.

In this method, the alcohol component and the carboxylic acid component may be allowed to be previously present in the reaction system upon the addition polymerization reaction, followed by adding the esterification catalyst, if required, together with the esterification promoter, to the reaction system at a temperature suitable for the polycondensation reaction to initiate the polycondensation reaction. Alternatively, the alcohol component and the polycarboxylic acid component may be subsequently added to the reaction system under the temperature conditions suitable for the polycondensation reaction to initiate the polycondensation reaction. In the former case, by adding the esterification catalyst, if required, together with the esterification promoter, to the reaction system at a temperature suitable for the polycondensation reaction, it is possible to well control a molecular weight and a molecular weight distribution of the resulting polymer.

(3) Method of conducting the step (X) of subjecting the alcohol component and the carboxylic acid component to polycondensation reaction and the step (Y) of subjecting the raw material monomer of the vinyl resin segment (B) and the bireactive monomer to addition polymerization reaction in parallel with each other.

In this method, it is preferred that the step (X) and the step (Y) are conducted under the temperature conditions suitable for the addition polymerization reaction, and then the reaction temperature is raised until reaching the temperature conditions suitable for the polycondensation reaction, under which the polycondensation reaction as the step (X) is further conducted, if required, by adding a trivalent or higher-valent raw material monomers of the polyester resin segment (A), etc., as a crosslinking agent, to the reaction system. In such a case, under the temperature conditions suitable for the polycondensation reaction, it is possible to allow the polycondensation reaction only to proceed by adding a polymerization inhibitor to the reaction system. The bireactive monomer is concerned in not only the addition polymerization reaction but also the polycondensation reaction.

Of these methods, the method (1) is preferred because the degree of flexibility for the polycondensation reaction temperature may be high. The aforementioned respective methods (1) to (3) are preferably conducted in the same reaction vessel.

[Addition Polymerization Reaction Temperature]

The temperature used for the addition polymerization reaction is preferably 110° C. or higher, more preferably 130° C. or higher and even more preferably 150° C. or higher, and is also preferably 220° C. or lower, more preferably 190° C. or lower and even more preferably 170° C. or lower, from the viewpoint of improving the reactivity. Also, the reaction system is preferably maintained under reduced pressure in a later stage of the addition polymerization reaction to promote the reaction.

<<Polymerization Inhibitor>>

The polymerization inhibitor may be a radical polymerization inhibitor. Specific examples of the radical polymerization inhibitor include 4-tert-butylcatechol.

<Optional Components>

The binder resin composition of the present invention may also contain conventionally known resins that may be used for toner, for example, any other polyester-based resins other than the above-mentioned polyester-based resins, styrene-acrylic copolymer resins, epoxy resins, polycarbonate resins, and polyurethane resins.

In addition, the binder resin composition of the present invention may also appropriately contain various additives such as a colorant, a releasing agent, a charge controlling agent, a magnetic powder, a fluidity enhancer, a conductivity controlling agent, an extender pigment, a reinforcing filler such as fibrous substances, an antioxidant, an anti-aging agent and a cleaning property enhancer.

Meanwhile, in the present description, the resin component including a polyester-based resin, polyester particles and the above-mentioned known resin optionally used therein may be referred to as "binder resin". The content of the polyester-based resin and the polyester particles in the binder resin is, from the viewpoint of the fusing properties on PP films, preferably 80% by mass or more, more preferably 90% by mass or more, more preferably 95% by mass or more, and is 100% by mass or less, more preferably 100% by mass.

[Colorant]

Examples of the colorant include various pigments, such as carbon blacks, inorganic composite oxides, Chrome Yellow, Hansa Yellow, Benzidine Yellow, Threne Yellow, Quinoline Yellow, Permanent Orange GTR, Pyrazolone Orange, Vulcan Orange, Watchung Red, Permanent Red, Brilliant Carmine 3B, Brilliant Carmine 6B, DuPont Oil Red, Pyrazolone Red, Lithol Red, Rhodamine B Lake, Lake Red C, red iron oxide, Aniline Blue, ultramarine blue, calco oil blue, Methylene Blue Chloride, Phthalocyanine Blue, Phthalocyanine Green and Malachite Green Oxalate; and various dyes, such as acridine dyes, xanthene dyes, azo dyes, benzoquinone dyes, azine dyes, anthraquinone dyes, indigo dyes, thioindigo dyes, phthalocyanine dyes, Aniline Black dyes, polymethine dyes, triphenylmethane dyes, diphenylmethane dyes, thiazine dyes and thiazole dyes. These colorants may be used alone or in combination of any two or more thereof.

The content of the colorant in the binder resin composition is preferably 0.1 parts by mass or more, more preferably 0.5 parts by mass or more and even more preferably 1 part by mass or more, and is also preferably 40 parts by mass or less, more preferably 20 parts by mass or less and even more preferably 10 parts by mass or less, on the basis of 100 parts by weight of the binder resin, from the viewpoint of improving an image density of the toner.

[Releasing Agent]

Examples of the releasing agent include polyolefin waxes such as polypropylene wax, polyethylene wax (paraffin wax), and polypropylene-polyethylene copolymer wax; hydrocarbon waxes or their oxides such as microcrystalline wax, Fischer-Tropsch wax, and Sasol wax; ester waxes such as carnauba wax, montan wax or deoxidized wax thereof, and fatty acid ester wax; and fatty acid amides, fatty acids, higher alcohols, and fatty acid metal salts. These may be used either singly or in combination of two or more thereof. Among these, at least one selected from polyolefin waxes and ester waxes is preferred, and ester waxes are more preferred.

The melting point of the releasing agent is, from the viewpoint of the transferability of the resulting toner, preferably 60° C. or higher, more preferably 70° C. or higher, and is, from the viewpoint of the low-temperature fusing property thereof, preferably 100° C. or lower, more preferably 90° C. or lower, more preferably 85° C. or lower.

The content of the releasing agent in the binder resin composition is, from the viewpoint of expanding the non-offset region of the resulting toner, preferably 0.5 parts by mass or more more preferably 1 part by mass or more, even more preferably 1.5 parts by mass or more, and is, from the viewpoint of the dispersibility of the releasing agent in the binder resin, preferably 10 parts by mass or less, more preferably 8 parts by mass or less, even more preferably 7 parts by mass or less, relative to 100 parts by mass of the binder resin.

[Charge Controlling Agent]

Examples of the charge controlling agent include chromium-based azo dyes, iron-based azo dyes, aluminum-based azo dyes and metal complexes of salicylic acid. These charge controlling agents may be used alone or in combination of any two or more thereof.

The content of the charge controlling agent in the binder resin composition is preferably 0.01 parts by mass or more, more preferably 0.1 parts by mass or more and even more preferably 0.2 parts by mass or more, and is also preferably 3 parts by mass or less, more preferably 2 parts by mass or less and even more preferably 1.5 parts by mass or less, on the basis of 100 parts by mass of the binder resin, from the viewpoint of improving the charging stability of the toner.

<Production Method for Binder Resin Composition>

The binder resin composition of the present invention may be produced, for example, by mixing the polyester-based resin and the polyolefin. The binder resin composition may be mixed with a surfactant and any other optional components mentioned above, in addition to the polyester-based resin and the polyolefin.

A mixture containing the polyester-based resin and the polyolefin is preferably produced according to the following Production Method 1A, from the viewpoint of controlling the volume median diameter of the small particle size component and the large particle size component of the polyolefin particles therein, as well as the content and the melting endothermic energy amount thereof. However, in the case where the polyester-based resin is a composite resin, the mixture is preferably produced according to the following Production Method 1B. Specifically, the production method for the binder resin composition of the present invention is preferably the following Production Method 1A or 1B.

[Production Method 1A]

The Production Method 1A for the binder resin composition includes the following step 1A.

Step 1A: subjecting a carboxylic acid component and an alcohol component to polycondensation reaction in the presence of a polyolefin to give a mixture containing a polyester-based resin and a polyolefin.

In the step 1A, the time of addition of the polyolefin may be either before the polycondensation reaction or during the polycondensation reaction.

In the step 1A, more preferably, the carboxylic acid component and the alcohol component of the raw material monomers for the polyester-based resin are mixed with the polyolefin and then polycondensed to give a polyester-based resin. From the viewpoint of increasing the content of the small particle size component, preferably, the polycondensation is carried out with melting and stirring the components in the absence of a solvent.

[Production Method 1B]

The Production Method 1B for the binder resin composition includes the following step 1B-1 and the step 1B-2, and a polyolefin is added to the reaction system prior to the addition polymerization of the step 1B-2.

Step 1B-1: subjecting an alcohol component and a carboxylic acid component to polycondensation to form a polyester resin segment (A).

Step 1B-2: subjecting a vinyl monomer, preferably a vinyl monomer having an aliphatic hydrocarbon group having 6 or more and 22 or less carbon atoms to addition polymerization to form a vinyl resin segment (B).

The above-mentioned wording "prior to addition polymerization" means any of (i) before polycondensation, (ii) during polycondensation, (iii) after polycondensation and before addition polymerization, or (iv) after polycondensation and during addition polymerization. Specifically, a polyolefin may be added to the reaction system before polycondensation, during polycondensation, after polycondensation and before addition polymerization, or after polycondensation and during addition polymerization. Above all, preferably, the addition polymerization is carried out in the presence of a polyolefin. Specifically, more preferably, after a polyester resin segment (A) has been formed by polycondensation, a polyolefin is added thereto, and then a raw material monomer for a vinyl resin segment (B) is added and subjected to addition polymerization to produce a composite resin. Regarding the polycondensation and the addition polymerization, preferably, the polycondensation is carried out with melting and stirring the system in the absence of a solvent from the viewpoint of increasing the content of the small particle size component.

According to the process, it is considered that the affinity between the polyolefin and the composite resin can be increased, and the inclusion performance of the polyolefin in the resin can be enhanced, therefore promoting formation of polyolefin fine particles to control the melting endothermic energy amount of the small particle size component.

Preferred embodiments of the composite resin are as mentioned above. The ratio by mass of the polyolefin to the composite resin, that is, the binder resin is also as mentioned above.

The "reaction system" as referred to herein includes the system of polycondensation in the step 1B-1, or the system of addition polymerization in the step 1B-2. "Addition" includes an embodiment of previously mixing the target component in the raw material monomer.

Examples of the polymerization initiator for use in the step 1B-2 include alkyl peroxides such as dibutyl peroxide, dibutylhexyl peroxide, p-menthane hydroperoxide and 1,1,3,3-tetramethylbutyl hydroperoxide. Of these, preferred is dibutyl peroxide.

<Properties and Applications of Binder Resin Composition>

The softening point of the binder resin composition is preferably 85° C. or higher, more preferably 95° C. or higher and even more preferably 105° C. or higher, and is also preferably 130° C. or lower, more preferably 120° C. or lower and even more preferably 115° C. or lower, from the viewpoint of the fusing properties of the resulting toner on PP films.

The glass transition temperature of the binder resin composition is preferably 30° C. or higher, more preferably 40° C. or higher and even more preferably 45° C. or higher, and is also preferably 90° C. or lower, more preferably 70° C. or lower and even more preferably 55° C. or lower, from the viewpoint of the fusing properties of the resulting toner on PP films.

The acid value of the binder resin composition is preferably 4 mgKOH/g or more, more preferably 8 mgKOH/g or more and even more preferably 12 mgKOH/g or more, and is also preferably 40 mgKOH/g or less, more preferably 35 mgKOH/g or less and even more preferably 30 mgKOH/g or less, from the viewpoint of the fusing properties of the resulting toner on PP films.

The softening point, glass transition temperature and acid value of the binder resin composition may be suitably controlled by appropriately selecting kinds and proportions of the raw material monomers used as well as production conditions such as reaction temperature, reaction time and cooling rate or the like. In addition, the softening point, glass transition temperature and acid value of the binder resin composition may be respectively determined by the methods described in Examples below.

Meanwhile, as an embodiment of the binder resin composition according to the present invention, there may be mentioned a melt-kneaded material of the binder resin composition, an organic solvent solution of the binder resin composition or the like. The methods for production of the respective embodiments of the binder resin composition are described in the below-mentioned method for producing the toner.

The binder resin composition of the present invention is preferably used for printing images on PP films as a printing medium by an electrophotographic method because of the excellent fusing properties of the resulting toner on PP films.

The binder resin composition of the present invention is usable in printing on plastic films such as polypropylene films, polyethylene terephthalate (PET) films, nylon films or vinyl chloride films, but is preferably used for production of a toner for development of electrostatic images for printing on polypropylene films. The binder resin composition of the present invention is preferably used for printing on polypropylene films according to an electrophotographic method.

[Toner and Production Method Thereof]

The toner for development of electrostatic images (hereinafter this may be simply referred to as "toner") of the present invention includes the above-mentioned binder resin composition.

The toner may be in the form of either a pulverized toner according to a melt-kneading method or an emulsified and aggregated toner according to an aggregating and coalescing method, and is preferably in the form of a pulverized toner.

Examples of a method for producing the toner include the following methods.

(1) Method of melt-kneading a raw material mixture for toner containing a binder resin composition and pulverizing the resulting melt-kneaded material to thereby produce a toner;

(2) Method of aggregating and coalescing binder resin particles formed of a binder resin composition in a raw material mixture for toner which contains a dispersion prepared by dispersing a binder resin composition in a water-soluble medium to give toner base particles to be a toner;

(3) Method of stirring a dispersion prepared by dispersing a binder resin composition in a water-soluble medium and raw materials for toner at a high speed to give toner base particles to be a toner.

From the viewpoint of enhancing the productivity of toner as well as from the viewpoint of improving the fusing properties of the toner, preferred is the melt-kneading method (1). In addition, a toner may also be produced by the aggregating and coalescing method (2).

When the toner is produced by any of the aforementioned methods, the content of the binder resin composition is preferably 20% by mass or more, more preferably 30% by mass or more, even more preferably 40% by mass or more, further even more preferably 50% by mass or more, and is also preferably 100% by mass or less and more preferably 90% by mass or less, even more preferably 80% by mass or less and further more preferably 70% by mass or less, in the toner resin of toner, from the viewpoint of enhancing the fusing properties of the resulting toner on PP films.

The toner may contain any other polyester-based resin than the above-mentioned binder resin composition. Preferred examples of the other polyester-based resin include the resins exemplified as the above-mentioned binder resin. Among these, a polyester resin consisting of a polyester moiety is preferred.

Among the above-mentioned resins, preferably, the other polyester-based resins include, from the viewpoint of expanding the non-offset region of the resulting toner, a resin H having a softening point higher by 20° C. or more than that of the binder resin composition, and more preferably include two kinds of resins, a resin H and a resin L differing in the softening point by 20° C. or more.

The softening point of the resin H having a higher softening point is preferably 170° C. or lower, more preferably 160° C. or lower, and is preferably 110° C. or higher, more preferably 120° C. or higher, and more preferably 130° C. or higher, from the viewpoint of expanding the non-offset region.

The difference in the softening point between the resin H and the binder resin composition is, from the viewpoint of expanding the non-offset region, preferably 10° C. or more, more preferably 20° C. or more, even more preferably 25° C. or more, and is preferably 60° C. or less, more preferably 50° C. or less, and even more preferably 40° C. or less.

The softening point of the resin L having a lower softening point is, from the viewpoint of expanding the non-offset region, preferably 80° C. or higher, more preferably 95° C. or higher, and is preferably 125° C. or lower, more preferably 115° C. or lower.

In the case where the toner contains both a resin H and a resin L, the difference in the softening point between the resin H and the resin L is, from the viewpoint of expanding the non-offset region, preferably 10° C. or more, more preferably 20° C. or more, even more preferably 25° C. or more, and is preferably 60° C. or less, more preferably 50° C. or less, and even more preferably 40° C. or less.

In the case where the toner contains both a resin H and a resin L, the ratio by mass of the resin H to the resin L (resin H/resin L) is preferably 20/80 or more, more preferably 30/70 or more, more preferably 40/60, and is preferably 90/10 or less, more preferably 80/20 or less, even more preferably 70/30 or less, and further more preferably 60/40 or less, from the viewpoint of expanding the non-offset region.

Preferably, the resin H and the resin L are amorphous resins.

In the case where the resin H and the resin L are amorphous resins, those containing an aromatic polyol compound as the alcohol component therein are preferred among the above-mentioned resins. Preferred examples of the aromatic polyol compound and the other preferred examples are the same as those in the above-mentioned exemplifications.

The content of the other polyester-based resin is preferably 0% by mass or more, more preferably 10% by mass or more, more preferably 20% by mass or more, more preferably 30% by mass or more, and is preferably 95% by mass or less, more preferably 90% by mass or less, even more preferably 70% by mass or less, even more preferably 60% by mass or less, and further more preferably 50% by mass or less.

The toner may contain the above-mentioned colorant.

The content of the colorant in the toner is, from the viewpoint of improving the toner image density, preferably 0.1 parts by mass or more, more preferably 0.5 parts by mass or more, more preferably 1 part by mass or more, and is preferably 40 parts by mass or less, more preferably 20 parts by mass or less and more preferably 10 parts by mass or less, relative to 100 parts by mass of the binder resin therein.

Preferably, the toner contains the above-mentioned releasing agent.

The content of the releasing agent in the toner is, from the viewpoint of expanding the non-offset region, preferably 0.5 parts by mass or more, more preferably 1.0 parts by mass or more, even more preferably 1.5 parts by mass or more, and is, from the viewpoint of the dispersibility thereof in the binder resin, preferably 10 parts by mass or less, more preferably 8 parts by mass or less, and even more preferably 7 parts by mass or less, relative to 100 parts by mass of the binder resin.

The toner may contain the above-mentioned charge controlling agent.

The content of the charge controlling agent in the toner is preferably 0.01 parts by mass or more, more preferably 0.1 parts by mass or more, more preferably 0.2 parts by mass or more, and is preferably 3 parts by mass or less, more preferably 2 parts by mass or less, and more preferably 1.5 parts by mass or less, relative to 100 parts by mass of the binder resin therein, from the viewpoint of the charge stability of the toner.

(1) Method of melt-kneading binder resin composition and pulverizing the resulting melt-kneaded material to produce toner (melt-kneading and pulverizing method):

The method (1) preferably includes the following steps 2A-1 and 2A-2.

Step 2A-1: melt-kneading a raw material mixture for toner containing the above-mentioned binder resin composition.

Step 2A-2: pulverizing the melt-kneaded material obtained in the step 2A-1 and classifying the resulting pulverized product.

<Step 2A-1>

In addition, in the step 2A-1, the raw material mixture is preferably further melt-kneaded together with any other polyester-based resin and additives such as a colorant, a releasing agent and a charge controlling agent.

The melt-kneading of the raw material mixture, etc., may be conducted using a conventionally known kneader such as a closed-type kneader, a single- or twin-screw extruder, and an open roll kneader. Of these kneaders, from the viewpoint of highly dispersing the additives such as a colorant, a charge controlling agent and a releasing agent in the toner with good efficiency even without repeating the kneading operation or using any dispersant, a twin-screw extruder is preferably used, and a co-rotation twin screw extruder is more preferred.

It is preferred that the binder resin composition of the present invention as well as other polyester-based resin and additives such as a colorant, a charge controlling agent and a releasing agent are previously mixed using a mixer such as a Henschel mixer or a ball mill, and then the resulting mixture is fed to the kneader.

The screw temperature may be controlled, for example, by the temperature of the heating medium to run inside the screw.

The heating temperature inside the screw is, from the viewpoint of the fusing properties of the resulting toner on PP films, preferably 20° C. or higher, more preferably 30° C. or higher, and is preferably 150° C. or lower, more preferably 100° C. or lower.

The screw rotating speed is preferably 50 r/min or more, more preferably 100 r/min or more and even more preferably 150 r/min or more, and is also preferably 350 r/min or less, more preferably 300 r/min or less and even more preferably 250 r/min or less, from the viewpoint of improving the dispersibility of the additives such as a colorant, a charge controlling agent and a releasing agent in the toner as well as from the viewpoint of reducing the mechanical force required upon the melt-kneading and suppressing the heat generation thereupon.

The melt-kneaded material obtained in the step 2A-1 is cooled to such an extent that it can be pulverized, and then subjected to the subsequent step 2A-2.

<Step 2A-2>

In the step 2A-2, the melt-kneaded material obtained in the step 2A-1 is pulverized, and then the resulting pulverized product is classified.

The pulverization step may be conducted in multiple stages. For example, a resin kneaded material obtained by curing the melt-kneaded material may be coarsely pulverized into a size of about 1 to about 5 mm, and then the thus obtained coarsely pulverized product may be further finely pulverized into a desired particle size.

The pulverizer used in the pulverization step is not particularly limited. Examples of the pulverizer suitably used for the coarse pulverization include a hammer mill, an atomizer, a Rotoplex, etc. In addition, examples of the pulverizer suitably used for the fine pulverization include a fluidized bed jet mill, an impingement plate-type jet mill, a rotating mechanical mill, etc. Of these pulverizers, from the viewpoint of improving pulverization efficiency, preferred is a fluidized bed jet mill or an impingement plate-type jet mill, and more preferred is a fluidized bed jet mill.

Examples of the classifier used for the classification step include a rotor-type classifier, an airflow-type classifier, an inertia classifier, and a sieve-type classifier. If the degree of pulverization of the material to be subjected to the classification step is still insufficient, the material may be subjected again to the pulverization step, and if required, the pulverization step and the classification step may be repeated as desired.

(2) Method of aggregating and coalescing binder resin particles in a dispersion prepared by dispersing a binder resin composition in a water-soluble medium (aggregating and coalescing method):

The method (2) preferably includes the following steps 2B-1, 2B-2 and 2B-3.

Step 2B-1: obtaining an aqueous dispersion of binder resin particles containing a binder resin composition of the present invention.

Step 2B-2: aggregating the binder resin particles obtained in the step 2B-1 and, if required, raw materials for toner to give aggregated particles.

Step 2B-3: coalescing the aggregated particles obtained in the step 2B-2.

<Step 2B-1>

The aqueous dispersion of binder resin particles containing a binder resin composition (hereinafter also referred to as an "aqueous dispersion") is preferably produced by the following step 2B-1a.

Step 2B-1a: adding an aqueous medium to an organic solvent solution containing the binder resin composition to subject the solution to phase inversion emulsification, thereby giving the aqueous dispersion of binder resin particles containing a binder resin composition.

The aqueous dispersion means a liquid system of binder resin particles dispersed in a solvent containing an aqueous medium.

The particles that contain a binder resin composition contained in the aqueous dispersion may be referred to as "binder resin particles".

The aqueous dispersion may also contain an organic solvent in addition to the aqueous medium. The content of the aqueous medium in a whole amount of the aqueous medium and the organic solvent is preferably 50% by mass or more, more preferably 70% by mass or more, even more preferably 80% by mass or more, and is preferably 100% by mass or less, more preferably 90% by mass or less. In the following, a phase inversion emulsification method is described.

Phase inversion emulsification may be conducted by adding an aqueous medium to an organic solvent solution of a binder resin composition. When adding an aqueous medium to an organic solvent solution, a W/O phase is first formed, and then the thus formed W/O phase is subjected to phase inversion into an O/W phase. Whether the phase inversion takes place or not may be confirmed, for example, by observation by naked eyes, or measurement of electrical conductivity.

In phase inversion, the particle size of binder resin particles and others may be controlled by adjusting the velocity and amount of the aqueous medium added.

[Organic Solvent]

The organic solvent for use herein preferably has a solubility parameter (SP value: refer to "Polymer Handbook, Third Edition", published in 1989 by John Wiley & Sons, Inc.) of 15.0 MPa$^{1/2}$ or more, more preferably 16.0 MPa$^{1/2}$ or more and even more preferably 17.0 MPa$^{1/2}$ or more, and also preferably 26.0 MPa$^{1/2}$ or less, more preferably 24.0 MPa$^{1/2}$ or less and even more preferably 22.0 MPa$^{1/2}$ or less, from the viewpoint of improving solubility of polyester-based resin therein.

Examples of the organic solvent include alcohol solvents such as ethanol (26.0), isopropanol (23.5) and isobutanol (21.5); ketone solvents such as acetone (20.3), methyl ethyl ketone (19.0), methyl isobutyl ketone (17.2) and diethyl ketone (18.0); ether solvents such as dibutyl ether (16.5), tetrahydrofuran (18.6) and dioxane (20.5); and acetate solvents such as ethyl acetate (18.6) and isopropyl acetate (17.4). The parenthesized value on the right side of the name of each organic solvent is an SP value thereof and the unit is MPa$^{1/2}$.

Among these, from the viewpoint of the fusing properties of the resulting toner on PP films, preferred is at least one selected from methyl ethyl ketone, ethyl acetate and isopropyl acetate. Above all, methyl ethyl ketone is more preferred.

The ratio by mass of the organic solvent to the binder resin composition (organic solvent/binder resin composition) is preferably 0.1 or more, more preferably 0.2 or more and even more preferably 0.25 or more, and is also preferably 1 or less, more preferably 0.5 or less and even more preferably 0.35 or less.

In addition, in the step 2B-1a, from the viewpoint of improving the dispersion stability of the binder resin composition, it is preferable to add a neutralizing agent to the binder resin composition.

[Neutralizing Agent]

Examples of the neutralizing agent include hydroxides of alkali metals such as lithium hydroxide, sodium hydroxide and potassium hydroxide; and organic base compounds such as ammonia, trimethylamine, ethylamine, diethylamine, triethylamine, triethanolamine and tributylamine. Of these neutralizing agents, from the viewpoint of the fusing properties of the resulting toner on PP films, preferred is ammonia.

The equivalent (mol %) of the neutralizing agent used on the basis of an acid group of the polyester-based resin is preferably 10 mol % or more, more preferably 20 mol % or more and even more preferably 30 mol % or more, and is also preferably 150 mol % or less, more preferably 100 mol % or less and even more preferably 60 mol % or less.

Meanwhile, the equivalent (mol %) of the neutralizing agent used for neutralizing the polyester-based resin may be determined according to the following formula. In the case where the equivalent of the neutralizing agent used is 100 mol % or less, the equivalent of the neutralizing agent used has the same meaning as that of a degree of neutralization of the resin with the neutralizing agent. In the case where the equivalent of the neutralizing agent used which is determined according to the following formula exceeds 100 mol %, it means such a condition that the neutralizing agent is present in an excessive amount relative to the acid group of the resin. In such a case, the degree of neutralization of the resin is regarded as being 100 mol %.

Equivalent of neutralizing agent used={[mass (g) of neutralizing agent added/equivalent of neutralizing agent]/[[acid value of polyester-based resin (mgKOH/g)×mass (g) of resin]/(56×1000)]}×100

[Aqueous Medium]

The aqueous medium preferably contains water as a main component. Water is preferably deionized water or distilled water.

Examples of components other than water which may be contained in the aqueous medium include water-soluble organic solvents, e.g., aliphatic alcohols having 1 or more and 5 or less carbon atoms, such as methanol, ethanol, isopropanol and butanol; dialkyl, ketones containing an alkyl group having 1 or more and 3 or less carbon atoms, such as acetone and methyl ethyl ketone; and cyclic ethers such as tetrahydrofuran.

From the viewpoint of improving dispersion stability of the binder resin particles, the content of water in the aqueous medium is preferably 70% by mass or more, more preferably 80% by mass or more and even more preferably 90% by mass or more, and is also 100% by mass or less, and furthermore preferably 95% by mass or less.

The temperature used upon addition of the aqueous medium is preferably 15° C. or higher, more preferably 20° C. or higher and even more preferably 25° C. or higher, and is also preferably 80° C. or lower, more preferably 60° C. or lower and even more preferably 40° C. or lower, from the viewpoint of improving dispersion stability of the binder resin particles.

From the viewpoint of improving dispersion stability of the binder resin particles, the velocity of addition of the aqueous medium before the phase inversion emulsification is preferably 0.1 parts by mass/minute or more, more preferably 1 part by mass/minute or more and even more preferably 3 parts by mass/minute or more, and is also preferably 50 parts by mass/minute or less, more preferably 20 parts by mass/minute or less and even more preferably 10 parts by mass/minute or less, on the basis of 100 parts by mass of the binder resin composition. Meanwhile, the velocity of addition of the aqueous medium after the phase inversion emulsification is not particularly limited.

From the viewpoint of improving dispersion stability of the binder resin particles as well as from the viewpoint of obtaining uniform aggregated particles in the subsequent aggregation step, the amount of the aqueous medium added is preferably 100 parts by mass or more, more preferably 200 parts by mass or more and even more preferably 400 parts by mass or more, and is also preferably 900 parts by mass or less, more preferably 700 parts by mass or less and even more preferably 500 parts by mass or less, on the basis of 100 parts by mass of the binder resin composition.

If desired, the phase inversion emulsification may be followed by a step of removing the organic solvent from the dispersion obtained as a result of the phase inversion emulsification.

[Surfactant]

The phase inversion emulsification may also be followed by a step of mixing a surfactant in the resulting aqueous dispersion.

Examples of the surfactant include a nonionic surfactant, an anionic surfactant and a cationic surfactant. Of these surfactants, from the viewpoint of improving dispersion stability of the binder resin particles, preferred is at least one surfactant selected from a nonionic surfactant and an anionic surfactant, and more preferred is an anionic surfactant.

Examples of the nonionic surfactant include polyoxyethylene alkyl aryl ethers and polyoxyethylene alkyl ethers, such as polyoxyethylene nonyl phenyl ether, polyoxyethylene oleyl ether and polyoxyethylene lauryl ether.

Examples of the anionic surfactant include alkyl benzenesulfonic acid salts, such as sodium alkylbenzenesulfonates; alkyl sulfuric acid salts, such as sodium alkylsulfates; and alkylether sulfates, such as sodium alkylether sulfates. Of these anionic surfactants, from the viewpoint of improving dispersion stability of the binder resin particles, preferred are sodium alkylbenzenesulfonates and alkylether sulfates, and more preferred are alkylether sulfates.

Examples of the cationic surfactant include alkyltrimethylammonium chlorides, and dialkyldimethylammonium chlorides.

The amount of the surfactant added in the present step is preferably 0.5 parts by mass or more, more preferably 1 part by mass or more and even more preferably 2 parts by mass or more, and is also preferably 20 parts by mass or less, more preferably 15 parts by mass or less and even more preferably 13 parts by mass or less, on the basis of 100 parts by mass of the binder resin composition, from the viewpoint of improving dispersion stability of the binder resin particles.

Upon adding the surfactant, the dispersion is preferably stirred by an ordinary mixing and stirring apparatus such as a mixing stirrer equipped with an agitation blade, or an external circulation stirring apparatus.

The temperature used upon adding the surfactant is preferably 5° C. or higher, more preferably 10° C. or higher and even more preferably 20° C. or higher, and is also preferably 50° C. or lower, more preferably 40° C. or lower and even more preferably 35° C. or lower, from the viewpoint of improving the dispersibility of the surfactant in water.

[Volume Median Diameter ($D_{50}$) of Binder Resin Particles]

The volume median diameter ($D_{50}$) of the binder resin particles in the aqueous dispersion is preferably 60 nm or more, more preferably 100 nm or more and even more preferably 120 nm or more, and is also preferably 800 nm or less, more preferably 400 nm or less and even more preferably 200 nm or less, from the viewpoint of the fusing properties of the resulting toner on PP films.

The volume median diameter ($D_{50}$) as used herein means a particle size at which a cumulative volume frequency calculated on the basis of a volume fraction of the particles from a smaller particle size side thereof is 50%, and may be determined by the method described in the section of Examples below.

<Step 2B-2>

The step 2B-2 is the step of aggregating the binder resin particles obtained in the step 2B-1 to obtain aggregated particles.

In this step, an aggregating agent is preferably added to efficiently conduct aggregation of the binder resin particles. In addition, in the step 2B-2, various additives such as a colorant, a releasing agent, a charge controlling agent, a conductivity controlling agent, a reinforcing filler such as fibrous substances, an antioxidant and an anti-aging agent may be added.

[Aggregating Agent]

Examples of the aggregating agent for use in the present invention include organic aggregating agents such as a cationic surfactant in the form of a quaternary salt and polyethyleneimine; and inorganic aggregating agents such as inorganic metal salts and inorganic ammonium salts. Of these aggregating agents, from the viewpoint of the fusing properties of the resulting toner on PP films, preferred are inorganic aggregating agents, and more preferred are inorganic metal salts.

Specific examples of the inorganic metal salts include sodium sulfate, sodium chloride, calcium chloride, calcium nitrate, barium chloride, magnesium chloride, zinc chloride and aluminum chloride. Of these inorganic metal salts, preferred is calcium chloride.

The amount of the aggregating agent used is preferably 0.1 parts by mass or more, more preferably 0.15 parts by mass or more and even more preferably 0.2 parts by mass or more, and also is preferably 5 parts by mass or less, more preferably 1 part by mass or less and even more preferably 0.5 parts by mass or less, on the basis of 100 parts by weight of the binder resin particles, from the viewpoint of well controlling aggregation of the binder resin particles to obtain aggregated particles having a desired particle size. The aggregating agent is preferably added in the form of an aqueous solution prepared by dissolving the aggregating agent in an aqueous medium.

The solid concentration of the dispersion in the reaction system in the step 2B-2 is preferably 5% by mass or more, more preferably 10% by mass or more and even more preferably 15% by mass or more, and is also preferably 50% by mass or less, more preferably 40% by mass or less and even more preferably 30% by mass or less, from the viewpoint of allowing uniform aggregation of the binder resin particles.

The temperature used upon addition of the aggregating agent is preferably 0° C. or higher, more preferably 10° C. or higher and even more preferably 20° C. or higher, and is also preferably 60° C. or lower, more preferably 55° C. or lower and even more preferably 50° C. or lower, from the viewpoint of enhancing productivity of the toner.

[Colorant]

As the colorant used in the step 2B-2, there may be mentioned the same colorants as those that may be incorporated in a binder resin composition, and the preferred embodiments of the colorant used in the step 2B-2 are also the same as those used in the binder resin composition of the present invention.

The colorant may be added in the form of a colorant dispersion containing the colorant particles.

The volume median diameter ($D_{50}$) of the colorant particles is preferably 50 nm or more, more preferably 80 nm or more and even more preferably 100 nm or more, and is also preferably 500 nm or less, more preferably 300 nm or less and even more preferably 150 nm or less, from the viewpoint of obtaining a toner capable of forming high-quality images.

[Charge Controlling Agent]

As the charge controlling agent used in the step 2B-2, there may be mentioned the same charge controlling agents as those that may be incorporated in the binder resin composition of the present invention, and the preferred embodiments of the charge controlling agent used in the step 2B-2 are also the same as those used in the binder resin composition of the present invention.

The charge controlling agent may be added in the form of a charge controlling agent dispersion containing the charge controlling agent particles. The volume median diameter ($D_{50}$) of the charge controlling agent particles is preferably 100 nm or more, more preferably 200 nm or more and even more preferably 300 nm or more, and is also preferably 800 nm or less, more preferably 600 nm or less and even more preferably 500 nm or less.

The volume median diameter ($D_{50}$) of the resulting aggregated particles is preferably 2 μm or more, more preferably 3 μm or more and even more preferably 4 μm or more, and is also preferably 10 μm or less, more preferably 8 μm or less and even more preferably 6 μm or less, from the viewpoint of the fusing properties of the resulting toner on PP films.

<Step 2B-3>

The step 2B-3 is the step of coalescing the aggregated particles obtained in the step 2B-2. In this step, the respective particles that are present in the aggregated particles under such a condition that they are allowed to adhere to each other mainly by a physical force solely are coalesced and integrated together to form coalesced particles.

In this step, the reaction system is preferably maintained at a temperature not lower than a glass transition temperature of the polyester-based resin from the viewpoint of improving the coalescing properties of the aggregated particles as well as from the viewpoint of the fusing properties of the resulting toner on PP films.

From the viewpoint of improving coalescing properties of the aggregated particles as well as from the viewpoint of enhancing productivity of the toner, the temperature to be maintained in this step is preferably a temperature or higher, which is higher by 10° C. than the glass transition temperature of the polyester-based resin, more preferably a temperature or higher, which is higher by 15° C. than the glass transition temperature and even more preferably a temperature or higher, which is higher by 20° C. than the glass transition temperature, and is also preferably a temperature or higher, which is higher by 50° C. than the glass transition temperature of the polyester-based resin, more preferably a temperature or higher, which is higher by 40° C. than the glass transition temperature and even more preferably a temperature or higher, which is higher by 30° C. than the glass transition temperature.

Specifically, the temperature to be held in this step is preferably 70° C. or higher and more preferably 75° C. or higher, and is also preferably 100° C. or lower and preferably 90° C. or lower. The stirring velocity of the aggregated particles is preferably controlled so as not to cause precipitation of the aggregated particles.

When using an aggregation stopping agent, a surfactant is preferably used as the aggregation stopping agent. The aggregation stopping agent is more preferably an anionic surfactant. As the anionic surfactant, preferred is at least one compound selected from the group consisting of alkylether sulfates, alkyl sulfates and linear alkylbenzenesulfonates. Of these anionic surfactants, more preferred are alkylether sulfates.

<<Post-Treatment Step>>

The coalesced particles obtained in the aforementioned step are then appropriately subjected to a solid-liquid separation step such as filtration, a washing step and a drying step to thereby suitably obtain the toner of the present invention.

The volume median diameter ($D_{50}$) of the toner base particles is preferably 2 μm or more, more preferably 3 μm or more and even more preferably 4 μm or more, and is also preferably 20 μm or less, more preferably 15 μm or less and even more preferably 10 μm or less, from the viewpoint of the fusing properties of the resulting toner on PP films.

<External Addition Step>

Furthermore, in order to improve the flowability of the pulverized particles or the coalesced particles obtained in the previous step, an external additive may be added thereto. Examples of the external additive usable in the present invention include inorganic fine particles such as silica fine particles whose surfaces have been subjected to hydrophobic treatment, titanium oxide fine particles, alumina fine particles, cerium oxide fine particles and carbon blacks; and polymer fine particles such as fine particles of polycarbonates, polymethyl methacrylate, or silicone resins.

The number-average particle size of the external additive is preferably 4 nm or more, more preferably 8 nm or more and even more preferably 12 nm or more, and is also preferably 200 nm or less, more preferably 100 nm or less, more preferably 50 nm or less, and more preferably 30 nm or less, from the viewpoint of improving the flowability of the toner.

The amount of the external additive added is preferably 0.1 parts by mass or more, more preferably 0.5 parts by mass or more and even more preferably 1 part by mass or more, and is also preferably 5 parts by mass or less, more preferably 4 parts by mass or less and even more preferably 3 parts by mass or less, on the basis of 100 parts by mass of the toner particles before being treated with the external additive, from the viewpoint of improving flowability of the toner as well as environmental stability of the degree of chargeability of the toner base particles.

The volume median diameter ($D_{50}$) of the toner is preferably 2 μm or more, more preferably 3 μm or more and even more preferably 4 μm or more, and is also preferably 20 μm or less, more preferably 15 μm or less and even more preferably 10 μm or less, from the viewpoint of the fusing properties of the resulting toner on PP films.

[Printing Method]

The printing method of the present invention uses the above-mentioned toner for printing on plastic films according to an electrophotographic method.

Any known printer for the electrophotographic method may be used.

Examples of the plastic film include polypropylene films, polyethylene terephthalate films, polyvinyl chloride films, and nylon films. Among these, the toner of the present invention is extremely effective for polypropylene films on which toner fusion could not be sufficiently attained by already-existing techniques.

The plastic films for use herein may be corona-charged ones.

Commercial products of plastic films include Lumirror T60 (available from Toray Corporation, polyethylene terephthalate), PVC80B P (available from Lintec Corporation, vinyl chloride), DGS-210WH (available from Roland DG Corporation, vinyl chloride), transparent vinyl chloride RE-137 (available from Mimaki Engineering Co., Ltd.), KINATH KEE70CA (available from Lintec Corporation, polyethylene), YUPO SG90 PAT1 (available from Lintec Corporation, polypropylene), FOR and FOA (both available from Futamura Chemical Co., Ltd.), BONYL RX (available from KOHJIN Film & Chemicals Co., Ltd., nylon), and EMBLEM ONBC (available from Unitika Limited, nylon).

The fusing temperature in the electrophotographic method is preferably 80° C. or higher, more preferably 90° C. or higher, even more preferably 100° C. or higher, and is preferably 180° C. or lower, more preferably 160° C. or lower, even more preferably 150° C. or lower.

The printed material obtainable according to the above-mentioned electrophotographic method exhibits an excellent effect in fusing between the toner to form the printed image part and the plastic film (especially PP film).

With respect to the aforementioned embodiments, the present description further discloses the following binder resin composition, the toner for development of electrostatic images containing the binder resin composition, the printing method using it, and the printed material. Hereinunder, the wordings "contain (containing)" and "include (including)" each may be replaced with "consist of".

<1> A binder resin composition for toners for development of electrostatic images, including a polyester-based resin and polyolefin particles, wherein:

the polyolefin particles contain a polymer having a polymer skeleton of olefin having 2 or more and 3 or less carbon atoms, the volume median diameter ($D_{50}$) of a small particle size component, as measured according to a dynamic light scattering method using a dispersion S of a small particle size component obtainable according to the following Methods 1 and 2, is 20 nm or more and 400 nm or less, the content of a large particle size component obtainable according to Method 2 is 0% by mass or more and 30% by mass or less relative to the total amount of the large particle size component and the small particle size component, the content of the small particle size component is 70% by mass or more and 100% by mass or less relative to the total amount of the large particle size component and the small particle size component, and the melting endothermic energy amount of the small particle size component is 3 J/g or more and 10 J/g or less, Method 1: 1 part by mass of the binder resin composition and 30 parts by mass of methyl ethyl ketone are stirred for 1 hour to prepare a dispersion H; and Method 2: after stirring to prepare the dispersion H according to Method 1, the dispersion is allowed to stand for 24 hours to precipitate a large particle size component, and the resulting supernatant solution is separated therefrom, thereby obtaining a dispersion S of a small particle size component.

<2> The binder resin composition for toners for development of electrostatic images according to <1>, wherein the melting endothermic energy amount of the small particle size component is preferably 3.5 J/g or more, more preferably 4.0 J/g or more, even more preferably 4.5 J/g or more, and is preferably 9.5 J/g or less, more preferably 9.0 J/g or less, even more preferably 8.0 J/g or less, even more preferably 7.0 J/g or less, and even more preferably 6.5 J/g or less.

<3> The binder resin composition for toners for development of electrostatic images according to <1> or <2>, wherein the content of the small particle size component is 70% by mass or more, more preferably 75% by mass or more, more preferably 80% by mass or more, more preferably 85% by mass or more, more preferably 90% by mass or more, and is 100% by mass or less, preferably less than 100% by mass or less, and more preferably 99% by mass or less, relative to the total amount of the large particle size component and the small particle size component.

<4> The binder resin composition for toners for development of electrostatic images according to any of <1> to <3>, wherein the polymer having a polymer skeleton of olefin having 2 or more and 3 or less carbon atoms is preferably a polymer having a polypropylene skeleton or a polyethylene skeleton, more preferably a polymer having a polypropylene skeleton, more preferably a polypropylene.

<5> The binder resin composition for toners for development of electrostatic images according to any of <1> to <4>, wherein the content of the polyolefin particles in the binder resin composition is preferably 1 part by mass or more, more preferably 3 parts by mass or more, more preferably 5 parts by mass or more, more preferably 7 parts by mass or more, and is preferably 60 parts by mass or less, more preferably 40 parts by mass or less, more preferably 30 parts by mass or less, more preferably 25 parts by mass or less, and more preferably 15 parts by mass or less, relative to 100 parts by mass of the polyester resin.

<6> The binder resin composition for toners for development of electrostatic images according to any of <1> to <5>, wherein the polyester resin is a polyester resin consisting of a polyester moiety.

<7> The binder resin composition for toners for development of electrostatic images according to any of <1> to <5>, wherein the polyester-based resin is a composite resin containing a polyester resin segment (A) and a vinyl resin segment (B).

<8> The binder resin composition for toners for development of electrostatic images according to <7>, wherein the vinyl resin segment (B) preferably contains a constitutional unit derived from a vinyl monomer having an aliphatic hydrocarbon group having 6 or more and 22 or less carbon atoms, and more preferably contains a constitutional unit derived from a vinyl monomer having an aliphatic hydrocarbon group having 6 or more and 22 or less carbon atoms, and a constitutional unit derived from a styrene compound.

<9> The binder resin composition for toners for development of electrostatic images according to <8>, wherein the carbon number of the aliphatic hydrocarbon group in the vinyl monomer is preferably 7 or more, more preferably 8 or more, more preferably 10 or more, more preferably 11 or more, more preferably 13 or more, more preferably 15 or more, more preferably 17 or more, and is preferably 22 or less, more preferably 20 or less, more preferably 19 or less.

<10> The binder resin composition for toners for development of electrostatic images according to <9>, wherein the content of the constitutional unit derived from the vinyl monomer having an aliphatic hydrocarbon group having 6 or more and 22 or less carbon atoms in the vinyl resin segment (B) is preferably 8% by mass or more, more preferably 10% by mass or more, even more preferably 15% by mass or more, and is preferably 70% by mass or less, more preferably 60% by mass or less, more preferably 50% by mass or less and more preferably 40% by mass or less.

<11> The binder resin composition for toners for development of electrostatic images according to any of <7> to <10>, wherein the composite resin further contains a constitutional unit derived from a bireactive monomer capable of reacting with monomers of the polyester resin segment (A) and the vinyl resin segment (B).

<12> The binder resin composition for toners for development of electrostatic images according to <11>, wherein the content molar number of the bireactive monomer-derived constitutional unit is preferably 0.001 mol/g or more, more preferably 0.005 mol/g or more, more preferably 0.007 mol/g or more, more preferably 0.009 mol/g or more, and is preferably 0.10 mol/g or less, more preferably 0.05 mol/g or less, more preferably 0.03 mol/g or less, relative to the mass of the vinyl monomer-derived constitutional unit in the composite resin.

<13> A toner for development of electrostatic images, including the binder resin composition for toners for development of electrostatic images according to any of <1> to <12> in an amount of 20% by mass or more and 100% by mass or less relative to a binder resin present in the toner.

<14> The toner for development of electrostatic images according to <13>, wherein the content of the binder resin composition is preferably 20% by mass or more, more preferably 30% by mass or more, more preferably 40% by mass or more, more preferably 50% by mass or more, and is 100% by mass or less, more preferably 90% by mass or less, even more preferably 80% by mass or less, and further more preferably 70% by mass or less, relative to the binder resin present in the toner.

<15> The toner for development of electrostatic images according to <13> or <14>, including a releasing agent preferably in an amount of 0.5 parts by mass or more relative to 100 parts by mass of the binder resin therein, more preferably 1.0 parts by mass or more, even more preferably 1.5 parts by mass or more, and preferably in an amount of 10 parts by mass or less, more preferably 8 parts by mass or less, even more preferably 7 parts by mass or less.

<16> Use of the binder resin composition for toners for development of electrostatic images according to any of <1> to <12>, for production of a toner for development of electrostatic images for printing on plastic films, preferably on polypropylene films.

<17> Use of the binder resin composition for toners for development of electrostatic images according to any of <1> to <12>, for printing on plastic films, preferably on polypropylene films according to an electrophotographic method.

<18> Use of the toner for development of electrostatic images according to any of <13> to <15>, for printing on plastic films, preferably on polypropylene films according to an electrophotographic method.

<19> A printing method, including printing on plastic films, preferably polypropylene films, according to an electrophotographic method with the toner for development of electrostatic images according to any of <13> to <15>.

<20> A printed material, which is obtainable according to the method of <19>.

EXAMPLES

[Measurement Methods and Evaluation Methods]
Properties were measured and evaluated according to the following methods.

[Melting Point (Mp) of Polyolefin]
Using a differential scanning calorimeter "DSC210" available from Seiko Instruments Inc., a sample is heated to 200° C., and then cooled from that temperature to 0° C. at a temperature drop rate of 10° C./minute, and further heated at a temperature rise rate of 10° C./minute. The highest peak temperature of the heat of fusion is defined as a melting point of the sample.

[Acid Value and Hydroxyl Value of Polyolefin]
Measured according to JIS K 0070. However, with respect to only the solvent used for the measurement, the mixed solvent of ethanol and ether as prescribed in JIS K 0070 is replaced with chloroform.

[Acid Values of Binder Resin, and Binder Resin Composition (Composition Containing Polyester-Based Resin and Polyolefin Particles)]
Measured according to JIS K 0070. However, with respect to only the solvent used for the measurement, the mixed solvent of ethanol and ether as prescribed in JIS K 0070 is replaced with a mixed solvent of acetone and toluene (acetone/toluene=1/1 by volume).

[Softening Points and Glass Transition Temperatures of Binder Resin, and Binder Resin Composition (Composition Containing Polyester-Based Resin and Polyolefin Particles)]
(1) Softening Point
Using a flow tester "CFT-500D" available from Shimadzu Corporation, 1 g of a sample is extruded through a nozzle having a die pore diameter of 1 mm and a length of 1 mm while heating the sample at a temperature rise rate of 6° C./minute and applying a load of 1.96 MPa thereto by a plunger. The softening point is determined as the temperature at which a half amount of the sample is flowed out when plotting a downward movement of the plunger of the flow tester relative to the temperature.

(2) Endothermic Highest Peak Temperature

Using a differential scanning calorimeter "Q-100" available from TA Instruments Japan Inc., a sample is cooled from room temperature (20° C.) to 0° C. at a temperature drop rate of 10° C./minute and then allowed to stand as such under the conditions for 1 minute, and then heated to 180° C. at a temperature rise rate of 10° C./minute to measure an endothermic heat amount thereof. Among the endothermic peaks observed in the thus measured characteristic curve, the temperature of the peak located on the highest temperature side is defined as the endothermic highest peak temperature.

(3) Glass Transition Temperature

Using a differential scanning calorimeter "Q-100" available from TA Instruments Japan Inc., a sample is weighed in an amount of 0.01 to 0.02 g in an aluminum pan, heated to 200° C. and then cooled from 200° C. to 0° C. at a temperature drop rate of 10° C./minute, and the sample is further heated to 150° C. at a temperature rise rate of 10° C./minute to measure an endothermic heat amount thereof. The temperature at which an extension of the baseline below the endothermic highest temperature is intersected with a tangential line having a maximum inclination of the curve in the range of from a rise-up portion to an apex of the peak is read as the glass transition temperature.

[Volume Median Diameter ($D_{50}$) of Toner]

The volume median diameter ($D_{50}$) of toner is measured by the following method.

Measuring Apparatus: "Coulter Multisizer II" commercially available from Beckman Coulter Inc.

Aperture Diameter: 50 μm

Analyzing Software: "Coulter Multisizer AccuComp Ver. 1.19" commercially available from Beckman Coulter Inc.

Electrolyte Solution: "Isotone II" commercially available from Beckman Coulter Inc.

Dispersing Solution:

A 5% electrolyte solution of "EMULGEN 109P" (polyoxyethylene lauryl ether; HLB: 13.6) commercially available from Kao Corporation.

Dispersing Conditions:

Ten milligrams of a sample to be measured are added to 5 mL of the aforementioned dispersing solution, and dispersed therein using an ultrasonic disperser for 1 minute. Thereafter, 25 mL of the electrolyte solution is added to the resulting dispersion, and the obtained mixture is further dispersed using the ultrasonic disperser for 1 minute.

Measuring Conditions:

The thus prepared dispersion and 100 mL of the electrolyte solution are added to a beaker, and after controlling a concentration of the resultant dispersion in the beaker so as to complete the measurement for particle sizes of 30,000 particles within 20 seconds, the particle sizes of the 30,000 particles in the dispersion are measured under this condition, and the volume median diameter ($D_{50}$) of the particles is determined from a particle size distribution thereof.

[Volume Median Diameters ($D_{50}$) of Binder Resin Particles, Colorant Particles and Charge Controlling Agent Particles]

The volume median diameters ($D_{50}$) of the binder resin particles, the colorant particles and the charge controlling agent particles are measured by the following method.

(1) Measuring Apparatus: Laser diffraction particle size analyzer "LA-920" commercially available from HORIBA Ltd.

(2) Measuring Conditions: In a cell for the measurement which is filled with distilled water, the volume median diameter ($D_{50}$) of the particles in the dispersion is measured at a concentration at which an absorbance thereof falls within an adequate range.

[Solid Concentration of Colorant Dispersion, Charge Controlling Agent Dispersion and Aqueous Dispersion of Binder Resin Composition]

Using an infrared moisture meter "FD-230" available from Kett Electric Laboratory, 5 g of a sample to be measured is dried at a drying temperature of 150° C. under a measuring mode 96 (monitoring time: 2.5 minutes/variation range: 0.05%), and then subjected to measurement of a water content (% by mass) of the sample. The solid concentration is calculated according to the following formula.

Solid concentration (% by mass)=100−water content (% by mass) of sample

[Measurement of Melting Endothermic Energy Amount]

Using a differential scanning calorimeter "Q-100" available from TA Instruments Japan Inc., first, polyolefin is weighed in an amount of 0.01 to 0.02 g in an aluminum pan, heated to 200° C. and then cooled from that temperature to 0° C. at a temperature drop rate of 10° C./minute. Next, the polyolefin is further heated to 150° C. at a temperature rise rate of 10° C./minute to measure the melting endothermic energy amount ΔH (J/g) per gram of the polyolefin from the melting endothermic peak.

[Measurement of Particle Size of Polyolefin]

A Maruemu Screw Vial No. 7 is charged with 1 g of the binder resin composition and 30 g of methyl ethyl ketone, and the contents of the screw vial were stirred at room temperature (25° C.) for 1 hour using a stirring device "Mix Rotor Variable VMR-5R" available from AS ONE Corporation to dissolve the resin component therein to give a dispersion H.

The dispersion is stirred and then allowed to stand for 24 hours, so that a large particle size component of polyolefin is precipitated. A whole amount of the resulting supernatant solution of a dispersion S (transparent portion) is rapidly sampled with a Pasteur pipette and then the dispersion S is subjected to measurement of a volume median diameters ($D_{50}$) of the particles therein by a dynamic scattering method under the conditions mentioned below, and the thus measured value is defined as a volume median diameter ($D_{50}$) of a small particle size component of the polyolefin. In addition, the precipitated component of the dispersion is rinsed with 10 mL of methyl ethyl ketone twice, and then solid components are taken out therefrom. The mass of the thus obtained solid components is measured and defined as a mass ($M_b$) of a large particle size component of the polyolefin. 30 g of methyl ethyl ketone is further added to the remaining precipitate, and subjected to measurement of a volume median diameter ($D_{50}$) according to a dynamic light scattering method under the conditions mentioned below. The value is defined as a volume median diameter ($D_{50}$) of a large particle size component of the polyolefin, as measured according to a dynamic light scattering method. Subsequently, this is further allowed to stand for 24 hours, the resulting supernatant is immediately removed, and the precipitate alone is dried to measure the melting endothermic energy amount thereof according to the above-mentioned method.

<Measuring Conditions in Dynamic Light Scattering Method>

Solid concentration: 0.1% by mass
Measuring temperature: 25° C.
Medium: methyl ethyl ketone
Cell for measurement: Glass Cuvette
Measuring apparatus: dynamic light scattering particle size measuring apparatus "ZETA SIZER NANOZS" available from Malvern Instruments Ltd.
Specification of laser: He—Ne, 4 mW, 633 nm
Detection optical system: NIBS, 173° C.
Measurement frequency: 10 times
Isothermalization time: 5 minutes
Analyzing software: "Zeta Sizer Software 6.2"
Analyzing method: General Purpose Mode (cumulant method)

Subsequently, the dispersion S is separated into the polyolefin particles and the polyester-based resin therein, using a high-speed centrifuge "3K30C" (available from SIGMA Laborzentrifugen GmbH, Germany) under the following conditions.

Temperature: 25° C.
Weight of sample: 20 g
Rotor: "12158-H"
Sampling cell: "Centrifuge Ware 3119-0030" available from Nalgene
Sampling amount: 20 g
Rotating speed: 20,000 rpm
RCF (relative centrifugal force): $3.5 \times 10^4$ G
Time: 5 hours The precipitated component is washed with 10 mL of methyl ethyl ketone twice, and then solid components were taken out therefrom. The mass of the thus obtained solid components is measured and defined as a mass ($M_s$) of the small particle size component of the polyolefin particles. The melting endothermic energy amount of the resulting small particle size component of the polyolefin particles is measured according to the above-mentioned method.

Content (% by mass) of large particle size component of polyolefin particles=[mass ($M_b$) of large particle size component/(mass ($M_b$) of large particle size component+mass ($M_s$) of small particle size component)]×100

Content (% by mass) of small particle size component of polyolefin particles=[mass ($M_s$) of small particle size component/(mass ($M_b$) of large particle size component+mass ($M_s$) of small particle size component)]×100

[Fusion on PP Film]

The toner is loaded into a copying machine "AR-505" available from Sharp Corporation to form unfused images (printing area: 2 cm×12 cm: amount of toner deposited: 0.5 mg/cm$^2$). The resulting unfused images are fused on a printing medium using a fuser of the copying machine under the printing conditions of a temperature of 140° C. and a printing speed of 200 mm/sec. Meanwhile, as the printing medium, there is used a polypropylene film "OPU-0" available from Mitsui Chemicals Tohcello, Inc.

The resulting fused images are rubbed with a sand eraser having a bottom area of 15 mm×7.5 mm with a load of 500 g kept applied thereto, for a total of 5 reciprocating motions. Before and after rubbing, the optical reflection density of the images is measured using a spectrophotometric colorimeter "NF777CE" available from Nippon Denshoku Industries Co., Ltd. The residual rate of density after rubbing is calculated as follows.

Residual rate (%) of density after rubbing=(reflection density after rubbing/reflection density before rubbing)×100

[Fusion on Paper]

The toner is loaded into a copying machine "AR-505" available from Sharp Corporation to form unfused images (printing area: 2 cm×12 cm; amount of toner deposited: 0.5 mg/cm$^2$). The resulting unfused images are fused on a printing medium using a fuser of the copying machine under the printing conditions of a temperature of 140° C. and a printing speed of 200 mm/sec. Meanwhile, as the printing medium, there is used a coated paper "J COAT" available from Fuji Xerox Co., Ltd. (basis weight: 95 g/m$^2$, paper thickness: 97 μm). The resulting fused images are rubbed with a sand eraser having a bottom area of 15 mm×7.5 mm with a load of 500 g kept applied thereto, for a total of 5 reciprocating motions. Before and after rubbing, the optical reflection density of the images is measured using a spectrophotometric colorimeter "NF777CE" available from Nippon Denshoku Industries Co., Ltd. The residual rate of density after rubbing is calculated as follows.

Residual rate (%) of density after rubbing=(reflection density after rubbing/reflection density before rubbing)×100

[Non-Offset Range]

The toner is loaded into a copying machine "AR-505" available from Sharp Corporation to form unfused images (printing area: 2 cm×12 cm: amount of toner deposited: 0.5 mg/cm$^2$). Using a fuser of the copying machine (printing speed 200 mm/sec), the printed material in an unfused state is tested in a fusing test at different temperatures while the fusing roller temperature is successively increased from 90° C. to 240° C. at intervals of 5° C.

The fused images are checked for off-set, and the temperature range with no off-set is referred to as a non-offset range.

Production of Binder Resin Composition

Production of Binder Resin Composition Containing Amorphous Composite Resin

Production Examples A to Q (Binder Resin Compositions A to Q)

Raw material monomers of a polyester resin except for succinic acid and trimellitic anhydride as well as a polyolefin, an esterification catalyst and an esterification promoter as shown in Table 1 were charged into a 10-L four-necked flask equipped with a thermometer, a stainless steel stirring bar, a falling type condenser, a dewatering tube and a nitrogen inlet tube. The contents of the flask were heated to 235° C. in a mantle heater in a nitrogen atmosphere over 2 hours. Thereafter, the contents of the flask were subjected to polycondensation reaction at 235° C. for 10 hours, and then further reacted under a reduced pressure of 8 kPa for 1 hour. Then, after cooling the contents of the flask to 160° C., a mixed solution of raw material monomers for a vinyl resin, and a bireactive monomer and a radical polymerization initiator also shown in the Table was dropwise added to the flask over 1 hour. After that, the contents of the flask were allowed to stand at 160° C. for 30 minutes and subjected to addition polymerization reaction, and then heated to 200° C. over 1 hour and further reacted under a reduced pressure of 8 kPa for 1 hour. Then, after cooling the contents of the flask to 190° C., succinic acid and trimellitic anhydride were added to the flask, and the contents of the flask were heated to 210° C. over 3 hours, and the resulting mixture was reacted at 210° C. under 40 kPa until a softening point of the resulting reaction product reached the temperature shown in the Table, thereby producing binder resin compositions A to Q each containing an amorphous composite resin.

TABLE 1

|  |  |  | \multicolumn{8}{c}{Production Example} |
|---|---|---|---|---|---|---|---|---|---|---|
|  |  |  | \multicolumn{2}{c}{A} | \multicolumn{2}{c}{B} | \multicolumn{2}{c}{C} | \multicolumn{2}{c}{D} |
|  |  |  | \multicolumn{8}{c}{Binder Resin Composition} |
|  |  |  | \multicolumn{2}{c}{A} | \multicolumn{2}{c}{B} | \multicolumn{2}{c}{C} | \multicolumn{2}{c}{D} |
|  |  |  | g | part by mol *2 | g | part by mol *2 | g | part by mol *2 | g | part by mol *2 |
| Raw Material Monomers (A) for Polyester Resin Segment | Alcohol Component | BPA-PO (*1) | 1925 | 50 | 2450 | 50 | 2800 | 50 | 1225 | 50 |
|  |  | BPA-EO (*1) | 1788 | 50 | 2275 | 50 | 2600 | 50 | 1138 | 50 |
|  | Acid Component | Terephthalic Acid | 1004 | 55 | 1394 | 60 | 1647 | 62 | 639 | 55 |
|  |  | Succinic Acid | 130 | 10 | 215 | 13 | 283 | 15 | 17 | 2 |
|  |  | Trimellitic Anhydride | 211 | 10 | 267 | 10 | 307 | 10 | 134 | 10 |
| Bireactive Monomer | Acrylic Acid |  | 253 | 32 | 161 | 16 | 92 | 8 | 242 | 48 |

|  |  | g | % by mass *3 | g | % by mass *3 | g | % by mass *3 | g | % by mass *3 |
|---|---|---|---|---|---|---|---|---|---|
| Raw Material Monomers (B) for Vinyl Resin Segment | Styrene | 2100 | 70 | 1003 | 70 | 509 | 70 | 3023 | 70 |
|  | Stearyl Methacrylate (C18) | 900 | 30 | 430 | 30 | 218 | 30 | 1295 | 30 |
|  | Octyl Methacrylate (C8) |  |  |  |  |  |  |  |  |
| Molar Number of Bireactive Monomer/Total Mass of (B) (mol/g) |  | \multicolumn{2}{c}{0.011} | \multicolumn{2}{c}{0.011} | \multicolumn{2}{c}{0.011} | \multicolumn{2}{c}{0.011} |

|  |  | g | part by mass *4 | g | part by mass *4 | g | part by mass *4 | g | part by mass *4 |
|---|---|---|---|---|---|---|---|---|---|
| Polyolefin Particles | Polypropylene Wax (NP055) | 825 | 10 | 788 | 10 | 801 | 10 | 791 | 10 |
|  | Polypropylene Wax (NP105) |  |  |  |  |  |  |  |  |
|  | Polyethylene Wax (H105) |  |  |  |  |  |  |  |  |
| Esterification Catalyst | Tin(II) Di(2-ethylhexanoate) (g) | \multicolumn{2}{c}{40} | \multicolumn{2}{c}{40} | \multicolumn{2}{c}{40} | \multicolumn{2}{c}{40} |
| Esterification Promoter | Gallic Acid (g) | \multicolumn{2}{c}{2} | \multicolumn{2}{c}{2} | \multicolumn{2}{c}{2} | \multicolumn{2}{c}{2} |
| Radical Polymerization Initiator | Dibutyl Peroxide (g) | \multicolumn{2}{c}{300} | \multicolumn{2}{c}{140} | \multicolumn{2}{c}{73} | \multicolumn{2}{c}{432} |
| Polyester Resin Segment/Vinyl Resin Segment (ratio by mass) |  | \multicolumn{2}{c}{60/40} | \multicolumn{2}{c}{80/20} | \multicolumn{2}{c}{90/10} | \multicolumn{2}{c}{40/60} |
| Content of C6-22 Alkyl Group-Containing Monomer (% by mass) *5 |  | \multicolumn{2}{c}{30} | \multicolumn{2}{c}{30} | \multicolumn{2}{c}{30} | \multicolumn{2}{c}{30} |
| Properties | Softening Point (° C.) | \multicolumn{2}{c}{110.3} | \multicolumn{2}{c}{111.5} | \multicolumn{2}{c}{110.6} | \multicolumn{2}{c}{110.5} |
|  | Glass Transition Temperature (° C.) | \multicolumn{2}{c}{54.6} | \multicolumn{2}{c}{56.1} | \multicolumn{2}{c}{55.4} | \multicolumn{2}{c}{52.4} |
|  | Acid Value (mgKOH/g) | \multicolumn{2}{c}{21.2} | \multicolumn{2}{c}{22.4} | \multicolumn{2}{c}{24.2} | \multicolumn{2}{c}{19.8} |
|  | Crystallinity Index | \multicolumn{2}{c}{1.96} | \multicolumn{2}{c}{1.92} | \multicolumn{2}{c}{1.94} | \multicolumn{2}{c}{2.03} |
|  | Volume Median Diameter $D_{50}$(μm) of Large Particle Size Component | \multicolumn{2}{c}{10.6} | \multicolumn{2}{c}{12.3} | \multicolumn{2}{c}{14.1} | \multicolumn{2}{c}{14.6} |
|  | Melting Endothermic Energy Amount (J/g) of Large Particle Size Component | \multicolumn{2}{c}{60} | \multicolumn{2}{c}{60} | \multicolumn{2}{c}{60} | \multicolumn{2}{c}{60} |
|  | Content (% by mass) of Large Particle Size Component | \multicolumn{2}{c}{1} | \multicolumn{2}{c}{8} | \multicolumn{2}{c}{26} | \multicolumn{2}{c}{34} |
|  | Volume Median Diameter $D_{50}$(nm) of Small Particle Size Component | \multicolumn{2}{c}{142} | \multicolumn{2}{c}{150} | \multicolumn{2}{c}{157} | \multicolumn{2}{c}{146} |
|  | Content (% by mass) of Small Particle Size Component | \multicolumn{2}{c}{99} | \multicolumn{2}{c}{92} | \multicolumn{2}{c}{74} | \multicolumn{2}{c}{66} |
|  | Melting Endothermic Energy Amount (J/g) of Small Particle Size Component | \multicolumn{2}{c}{5.2} | \multicolumn{2}{c}{5.7} | \multicolumn{2}{c}{6.1} | \multicolumn{2}{c}{5.6} |

TABLE 1-continued

| | | | Production Example | | | | | | | |
|---|---|---|---|---|---|---|---|---|---|---|
| | | | E | | F | | G | | H | |
| | | | Binder Resin Composition | | | | | | | |
| | | | E | | F | | G | | H | |
| | | | g | part by mol *2 | g | part by mol *2 | g | part by mol *2 | g | part by mol *2 |
| Raw Material Monomers (A) for Polyester Resin Segment | Alcohol Component | BPA-PO (*1) | 2975 | 50 | 1925 | 50 | 1925 | 50 | 1925 | 50 |
| | | BPA-EO (*1) | 2763 | 50 | 1788 | 50 | 1788 | 50 | 1788 | 50 |
| | Acid Component | Terephthalic Acid | 1806 | 64 | 1004 | 55 | 1004 | 55 | 1059 | 58 |
| | | Succinic Acid | 301 | 15 | 52 | 4 | | | 143 | 11 |
| | | Trimellitic Anhydride | 326 | 10 | 211 | 10 | 211 | 10 | 211 | 10 |
| Bireactive Monomer | | Acrylic Acid | 49 | 4 | 356 | 45 | 412 | 52 | 198 | 25 |

| | | g | % by mass *3 | g | % by mass *3 | g | % by mass *3 | g | % by mass *3 |
|---|---|---|---|---|---|---|---|---|---|
| Raw Material Monomers (B) for Vinyl Resin Segment | Styrene | 257 | 70 | 2110 | 70 | 2113 | 70 | 2105 | 70 |
| | Stearyl Methacrylate (C18) | 110 | 30 | 904 | 30 | 904 | 30 | 902 | 30 |
| | Octyl Methacrylate (C8) | | | | | | | | |
| Molar Number of Bireactive Monomer/Total Mass of (B) (mol/g) | | 0.011 | | 0.015 | | 0.017 | | 0.008 | |

| | | g | part by mass *4 | g | part by mass *4 | g | part by mass *4 | g | part by mass *4 |
|---|---|---|---|---|---|---|---|---|---|
| Polyolefin Particles | Polypropylene Wax (NP055) | 807 | 10 | 829 | 10 | 830 | 10 | 827 | 10 |
| | Polypropylene Wax (NP105) | | | | | | | | |
| | Polethylene Wax (H105) | | | | | | | | |
| Esterification Catalyst | Tin(II) Di(2-ethylhexanoate) (g) | 40 | | 40 | | 40 | | 40 | |
| Esterification Promoter | Gallic Acid (g) | 2 | | 2 | | 2 | | 2 | |
| Radical Polymerization Initiator | Dibutyl Peroxide (g) | 37 | | 302 | | 302 | | 301 | |
| Polyester Resin Segment/Vinyl Resin Segment (ratio by mass) | | 95/5 | | 60/40 | | 60/40 | | 60/40 | |
| Content of C6-22 Alkyl Group-Containing Monomer (% by mass) *5 | | 30 | | 30 | | 30 | | 30 | |
| Properties | Softening Point (° C.) | 109.6 | | 110.1 | | 110.6 | | 112.5 | |
| | Glass Transition Temperature (° C.) | 56.4 | | 54.5 | | 54.6 | | 55.1 | |
| | Acid Value (mgKOH/g) | 25.6 | | 20.8 | | 21.1 | | 20.8 | |
| | Crystallinity Index | 1.89 | | 1.94 | | 1.94 | | 1.97 | |
| | Volume Median Diameter $D_{50}$(μm) of Large Particle Size Component | 18.3 | | 11.3 | | 15.4 | | 13.4 | |
| | Melting Endothermic Energy Amount (J/g) of Large Particle Size Component | 60 | | 60 | | 60 | | 60 | |
| | Content (% by mass) of Large Particle Size Component | 38 | | 9 | | 31 | | 28 | |
| | Volume Median Diameter $D_{50}$(nm) of Small Particle Size Component | 161 | | 136 | | 128 | | 158 | |
| | Content (% by mass) of Small Particle Size Component | 62 | | 91 | | 69 | | 72 | |
| | Melting Endothermic Energy Amount (J/g) of Small Particle Size Component | 7.2 | | 5.3 | | 4.7 | | 6.4 | |

TABLE 1-continued

|  |  |  | Production Example | | | | | | | |
|---|---|---|---|---|---|---|---|---|---|---|
|  |  |  | I | | J | | K | | L | |
|  |  |  | Binder Resin Composition | | | | | | | |
|  |  |  | I | | J | | K | | L | |
|  |  |  | g | part by mol *2 | g | part by mol *2 | g | part by mol *2 | g | part by mol *2 |
| Raw Material Monomers (A) for Polyester Resin Segment | Alcohol Component | BPA-PO (*1) | 1925 | 50 | 1925 | 50 | 1925 | 50 | 1925 | 50 |
|  |  | BPA-EO (*1) | 1788 | 50 | 1788 | 50 | 1788 | 50 | 1788 | 50 |
|  | Acid Component | Terephthliac Acid | 1059 | 58 | 1004 | 55 | 1004 | 55 | 1004 | 55 |
|  |  | Succinic Acid | 169 | 13 | 130 | 10 | 130 | 10 | 130 | 10 |
|  |  | Trimellitic Anhydride | 211 | 10 | 211 | 10 | 211 | 10 | 211 | 10 |
| Bireactive Monomer |  | Acrylic Acid | 158 | 20 | 253 | 32 | 253 | 32 | 253 | 32 |

|  |  | g | % by mass *3 | g | % by mass *3 | g | % by mass *3 | g | % by mass *3 |
|---|---|---|---|---|---|---|---|---|---|
| Raw Material Monomers (B) for Vinyl Resin Segment | Styrene | 2100 | 70 | 2700 | 90 | 2850 | 95 | 1500 | 50 |
|  | Stearyl Methacrylate (C18) | 900 | 30 | 300 | 10 | 150 | 5 | 1500 | 50 |
|  | Octyl Methacrylate (C8) |  |  |  |  |  |  |  |  |
| Molar Number of Bireactive Monomer/Total Mass of (B) (mol/g) |  | 0.007 | | 0.011 | | 0.011 | | 0.011 | |

|  |  | g | part by mass *4 | g | part by mass *4 | g | part by mass *4 | g | part by mass *4 |
|---|---|---|---|---|---|---|---|---|---|
| Polyolefin Particles | Polypropylene Wax (NP055) | 825 | 10 | 825 | 10 | 825 | 10 | 825 | 10 |
|  | Polypropylene Wax (NP105) |  |  |  |  |  |  |  |  |
|  | Polyethylene Wax (H105) |  |  |  |  |  |  |  |  |
| Esterification Catalyst | Tin(II) Di(2-ethylhexanoate) (g) | 40 | | 40 | | 40 | | 40 | |
| Esterification Promoter | Gallic Acid (g) | 2 | | 2 | | 2 | | 2 | |
| Radical Polymerization Initiator | Dibutyl Peroxide (g) | 300 | | 300 | | 300 | | 300 | |
| Polyester Resin Segment/Vinyl Resin Segment (ratio by mass) |  | 60/40 | | 60/40 | | 60/40 | | 60/40 | |
| Content of C6-22 Alkyl Group-Containing Monomer (% by mass) *5 |  | 30 | | 10 | | 5 | | 50 | |
| Properties | Softening Point (° C.) | 110.9 | | 110.5 | | 111.2 | | 110.3 | |
|  | Glass Transition Temperature (° C.) | 54.8 | | 57.2 | | 60.4 | | 52.8 | |
|  | Acid Value (mgKOH/g) | 21.9 | | 20.5 | | 21.6 | | 20.3 | |
|  | Crystallinity Index | 1.96 | | 1.88 | | 1.79 | | 2.01 | |
|  | Volume Median Diameter $D_{50}$(μm) of Large Particle Size Component | 18.3 | | 10.7 | | 10.7 | | 10.9 | |
|  | Melting Endothermic Energy Amount (J/g) of Large Particle Size Component | 60 | | 60 | | 60 | | 60 | |
|  | Content (% by mass) of Large Particle Size Component | 37 | | 21 | | 39 | | 3 | |
|  | Volume Median Diameter $D_{50}$(nm) of Small Particle Size Component | 175 | | 190 | | 220 | | 125 | |
|  | Content (% by mass) of Small Particle Size Component | 63 | | 79 | | 61 | | 97 | |
|  | Melting Endothermic Energy Amount (J/g) of Small Particle Size Component | 8.2 | | 8.5 | | 11.3 | | 4.6 | |

TABLE 1-continued

| | | | Production Example | | | | | |
|---|---|---|---|---|---|---|---|---|
| | | | M | | N | | O | |
| | | | Binder Resin Composition | | | | | |
| | | | M | | N | | O | |
| | | | g | part by mol *2 | g | part by mol *2 | g | part by mol *2 |
| Raw Material Monomers (A) for Polyester Resin Segment | Alcohol Component | BPA-PO (*1) | 1925 | 50 | 1750 | 50 | 1925 | 50 |
| | | BPA-EO (*1) | 1788 | 50 | 1625 | 50 | 1788 | 50 |
| | Acid Component | Terephthliac Acid | 1004 | 55 | 913 | 55 | 1004 | 55 |
| | | Succinic Acid | 130 | 10 | 118 | 10 | 130 | 10 |
| | | Trimellitic Anhydride | 211 | 10 | 192 | 10 | 211 | 10 |
| Bireactive Monomer | Acrylic Acid | | 253 | 32 | 230 | 32 | 253 | 32 |
| | | | g | % by mass *3 | g | % by mass *3 | g | % by mass *3 |
| Raw Material Monomers (B) for Vinyl Resin Segment | Styrene | | 2100 | 70 | 1909 | 70 | 2100 | 70 |
| | Stearyl Methacrylate (C18) | | 900 | 30 | 818 | 30 | 900 | 30 |
| | Octyl Methacrylate (C8) | | | | | | | |
| Molar Number of Bireactive Monomer/Total Mass of (B) (mol/g) | | | 0.011 | | 0.012 | | 0.011 | |
| | | | g | part by mass *4 | g | part by mass *4 | g | part by mass *4 |
| Polyolefin Particles | Polypropylene Wax (NP055) | | 417 | 5 | 1500 | 20 | | |
| | Polypropylene Wax (NP105) | | | | | | 825 | 10 |
| | Polyethylene Wax (H105) | | | | | | | |
| Esterification Catalyst | Tin(II) Di(2-ethylhexanoate) (g) | | 40 | | 40 | | 40 | |
| Esterification Promoter | Gallic Acid (g) | | 2 | | 2 | | 2 | |
| Radical Polymerization Initiator | Dibutyl Peroxide (g) | | 300 | | 272 | | 300 | |
| Polyester Resin Segment/Vinyl Resin Segment (ratio by mass) | | | 60/40 | | 60/40 | | 60/40 | |
| Content of C6-22 Alkyl Group-Containing Monomer (% by mass) *5 | | | 30 | | 30 | | 30 | |
| Properties | Softening Point (° C.) | | 110.5 | | 110.6 | | 111.5 | |
| | Glass Transition Temperature (° C.) | | 54.9 | | 54.3 | | 55.1 | |
| | Acid Value (mgKOH/g) | | 21.3 | | 21.5 | | 20.8 | |
| | Crystallinity Index | | 1.93 | | 1.96 | | 1.95 | |
| | Volume Median Diameter $D_{50}$(μm) of Large Particle Size Component | | 8.8 | | 12.3 | | 11.6 | |
| | Melting Endothermic Energy Amount (J/g) of Large Particle Size Component | | 60 | | 60 | | 75 | |
| | Content (% by mass) of Large Particle Size Component | | 1 | | 10 | | 2 | |
| | Volume Median Diameter $D_{50}$(nm) of Small Particle Size Component | | 136 | | 154 | | 151 | |
| | Content (% by mass) of Small Particle Size Component | | 99 | | 90 | | 98 | |
| | Melting Endothermic Energy Amount (J/g) of Small Particle Size Component | | 5.1 | | 6.0 | | 6.3 | |

TABLE 1-continued

|  |  |  | Production Example | | | |
|---|---|---|---|---|---|---|
|  |  |  | P | | Q | |
|  |  |  | Binder Resin Composition | | | |
|  |  |  | P | | Q | |
|  |  |  | g | part by mol *2 | g | part by mol *2 |
| Raw Material Monomers (A) for Polyester Resin Segment | Alcohol Component | BPA-PO (*1) | 1925 | 50 | 1925 | 50 |
|  |  | BPA-EO (*1) | 1788 | 50 | 1788 | 50 |
|  | Acid Component | Terephthliac Acid | 1004 | 55 | 1004 | 55 |
|  |  | Succinic Acid | 130 | 10 | 130 | 10 |
|  |  | Trimelhtic Anhydride | 211 | 10 | 211 | 10 |
| Bireactive Monomer |  | Acrylic Acid | 253 | 32 | 253 | 32 |
|  |  |  | g | % by mass *3 | g | % by mass *3 |
| Raw Material Monomers (B) for Vinyl Resin Segment |  | Styrene | 2100 | 70 | 2100 | 70 |
|  |  | Stearyl Methacrylate (C18) | 900 | 30 |  |  |
|  |  | Octyl Methacrylate (C8) |  |  | 900 | 30 |
| Molar Number of Bireactive Monomer/Total Mass of (B) (mol/g) |  |  |  | 0.011 |  | 0.015 |
|  |  |  | g | part by mass *4 | g | part by mass *4 |
| Polyolefin Particles |  | Polypropylene Wax (NP055) |  |  | 825 | 10 |
|  |  | Polypropylene Wax (NP105) |  |  |  |  |
|  |  | Polyethylene Wax (H105) | 825 | 10 |  |  |
| Esterification Catalyst |  | Tin(II) Di(2-ethylhexanoate) (g) |  | 40 |  | 40 |
| Esterification Promoter |  | Gallic Acid (g) |  | 2 |  | 2 |
| Radical Polymerization Initiator |  | Dibutyl Peroxide (g) |  | 300 |  | 300 |
| Polyester Resin Segment/Vinyl Resin Segment (ratio by mass) |  |  |  | 60/40 |  | 60/40 |
| Content of C6-22 Alkyl Group-Containing Monomer (% by mass) *5 |  |  |  | 30 |  | 0 |
| Properties | Softening Point (° C.) |  |  | 111.2 |  | 112.3 |
|  | Glass Transition Temperature (° C.) |  |  | 55.2 |  | 56.4 |
|  | Acid Value (mgKOH/g) |  |  | 20.9 |  | 21.4 |
|  | Crystallinity Index |  |  | 1.93 |  | 1.93 |
|  | Volume Median Diameter $D_{50}$(μm) of Large Particle Size Component |  |  | 13.1 |  | 10.6 |
|  | Melting Endothermic Energy Amount (J/g) of Large Particle Size Component |  |  | 103 |  | 60 |
|  | Content (% by mass) of Large Particle Size Component |  |  | 4 |  | 25 |
|  | Volume Median Diameter $D_{50}$(nm) of Small Particle Size Component |  |  | 147 |  | 189 |
|  | Content (% by mass) of Small Particle Size Component |  |  | 96 |  | 75 |
|  | Melting Endothermic Energy Amount (J/g) of Small Particle Size Component |  |  | 9.5 |  | 8.3 |

The annotations with asterisks appearing in Table 1 have the following meanings.

*1; BPA-PO means a polyoxypropylene (2.2) adduct of bisphenol A; and BPA-EO means a polyoxyethylene (2.2) adduct of bisphenol A.

*2: Mole part(s) of the monomers constituting the raw material monomers (A) and the bireactive monomer relative to 100 mole parts of the alcohol component of the raw material monomers (A).

*3: Content (% by mass) of the monomers constituting the raw material monomer (B) in the sum total of the raw material monomers (B).

*4: Content (part by mass) of the polyolefin particles relative to 100 parts by mass of the polyester resin.

*5: Content (% by mass) of the alkyl (meth)acrylate having an alkyl group having 6 to 22 carbon atoms in the raw material monomers (B).

The details of the waxes shown in Table are as follows.

NP055: Polypropylene wax "NP055" (viscosity-average molecular weight (Mp): 7300; melting point: 136° C.) available from Mitsui Chemicals, Inc.

NP105: Polypropylene wax "NP105" (viscosity-average molecular weight (Mp): 11,000; melting point: 140° C.) available from Mitsui Chemicals, Inc.

H105: Polyethylene wax "H105" (viscosity-average molecular weight (Mp): 1300; 114° C.) available from S. Kato & Co.

Production Examples a1 to a3 (Resins a1 to a3)

Raw material monomers of a polyester resin except for adipic acid and trimellitic anhydride and 40 g of tin(II) di(2-ethylhexanoate) as shown in the following Table were charged into a 10-L four-necked flask equipped with a thermometer, a stainless steel stirring bar, a falling type condenser, a dewatering tube and a nitrogen inlet tube. The contents of the flask were heated to 235° C. in a mantle heater in a nitrogen atmosphere over 2 hours. Thereafter, the contents of the flask were subjected to polycondensation reaction at 235° C. for 10 hours, and then further reacted under a reduced pressure of 8 kPa for 1 hour. Then, after cooling the contents of the flask to 200° C., adipic acid and trimellitic anhydride were added to the flask, reacted under normal pressure for 2 hours, and then further reacted under 8 kPa until the reaction mixture could reach the softening point shown in the Table to give amorphous resins a1 to a3.

The annotations with asterisks appearing in Table 2 have the following meanings.

*1: BPA-PO means a polyoxypropylene (2.2) adduct of bisphenol A; and BPA-EO means a polyoxyethylene (2.2) adduct of bisphenol A.

*2: Mole part(s) of the monomers constituting the raw material monomers (A) and the bireactive monomer relative to 100 mole parts of the alcohol component of the raw material monomers (A).

[Preparation of Releasing Agent Dispersion]

50 g of a paraffin wax "HNP9" (available from Nippon Seiro Co., Ltd.), 5 g of a cationic surfactant "Sanisol B50" (available from Kao Corporation, alkylbenzyldimethylammonium chloride, solid content: 50% by mass) and 200 g of ion-exchanged water were heated to 95° C., and using a homogenizer, the paraffin wax was dispersed, and then the resulting mixture was further dispersed using a pressure discharge homogenizer to give a releasing agent dispersion containing releasing agent particles. The volume median diameter ($D_{50}$) of the paraffin wax was 550 nm, and the solid concentration thereof was 22% by mass.

[Production of Colorant Dispersion]

50 g of copper phthalocyanine "ECB-301" available from Dainichiseika Color & Chemicals Mfg. Co., Ltd., 5 g of a nonionic surfactant "EMULGEN 150" (polyoxyethylene lauryl ether) available from Kao Corporation and 200 g of ion-exchanged water were mixed. The resulting mixture was dispersed using a homogenizer for 10 minutes to give a colorant dispersion containing colorant particles. The colorant particles had a volume median diameter ($D_{50}$) of 120 nm, and the colorant dispersion had a solid concentration of 22% by mass.

[Production of Charge Controlling Agent Dispersion]

50 g of a salicylic acid compound "BONTRONE E-84" as a charge controlling agent available from Orient Chemical Industries Co., Ltd., 5 g of a nonionic surfactant "EMULGEN 150" available from Kao Corporation and 200 g of ion-exchanged water were mixed. The resulting mixture was dispersed with glass beads using a sand grinder for 10 minutes to give a charge controlling agent dispersion containing charge controlling agent particles. The thus obtained charge controlling agent dispersion had a volume median diameter ($D_{50}$) of 400 nm, and a solid concentration of 22% by mass.

TABLE 2

| | | | \multicolumn{6}{c|}{Production Example} |
|---|---|---|---|---|---|---|---|---|
| | | | \multicolumn{2}{c|}{a1} | \multicolumn{2}{c|}{a2} | \multicolumn{2}{c|}{a3} |
| | | | \multicolumn{6}{c|}{Amorphous Resin} |
| | | | \multicolumn{2}{c|}{a1} | \multicolumn{2}{c|}{a2} | \multicolumn{2}{c|}{a3} |
| | | | g | part by mol *2 | g | part by mol *2 | g | part by mol *2 |
| Components | Alcohol Component | BPA-PO *1 | 5600 | 80 | 4200 | 60 | 4200 | 60 |
| | | BPA-EO *1 | 1300 | 20 | 2600 | 40 | 2600 | 40 |
| | Carboxylic Acid Component | Tereplithalic Acid | 2324 | 70 | 1826 | 55 | 2058 | 62 |
| | | Adipic Acid | | | 576 | 20 | 576 | 20 |
| | | Trimellitic Anhydride | 384 | 10 | 576 | 15 | 384 | 10 |
| Properties | \multicolumn{2}{l|}{Softening Point (° C.)} | \multicolumn{2}{c|}{99.8} | \multicolumn{2}{c|}{141.5} | \multicolumn{2}{c|}{137.4} |
| | \multicolumn{2}{l|}{Acid Value (mgKOH/g)} | \multicolumn{2}{c|}{12.3} | \multicolumn{2}{c|}{21.2} | \multicolumn{2}{c|}{19.6} |
| | \multicolumn{2}{l|}{Glass Transition Temperature (° C.)} | \multicolumn{2}{c|}{59.8} | \multicolumn{2}{c|}{67.8} | \multicolumn{2}{c|}{68.3} |
| | \multicolumn{2}{l|}{Crystallinity Index} | \multicolumn{2}{c|}{1.63} | \multicolumn{2}{c|}{2.02} | \multicolumn{2}{c|}{1.95} |

[Production of Aqueous Dispersion]
(Production of Aqueous Dispersion A-1 of Binder Resin Particles]

A 3 L-capacity reaction vessel equipped with a stirrer, a reflux condenser, a dropping funnel, a thermometer and a nitrogen inlet tube was charged with 150 g of the resin A and 75 g of ethyl acetate, in which the contents were dissolved at 70° C. over 2 hours. The resulting solution was mixed with a 20% by mass ammonia aqueous solution (pKa: 9.3) in such a manner that the equivalent ratio of the basic substance relative to acid of the resin could be 0.40, and stirred for 30 minutes.

While kept at 70° C. with continuously stirring at 280 r/min (peripheral speed: 88 m/min), 675 g of ion-exchanged water was added to the solution over 77 minutes for phase inversion emulsification. While further kept at 70° C., ethyl acetate was evaporated away under reduced pressure. Subsequently, while kept stirred at 280 r/min (peripheral speed: 88 m/min), the aqueous dispersion was cooled to 30° C., and then 16.7 g of an anionic surfactant "EMAL E27C" available from Kao Corporation was mixed therein. Afterwards, the solid concentration in the dispersion was measured, and ion-exchanged water was added so that the resulting dispersion could have a solid concentration of 20% by mass to thereby give an aqueous dispersion A-1 of binder resin composition particles dispersing therein. The mean particle size of the resulting dispersion was 190 nm.

(Production of Aqueous Dispersion a3-1)

A 3 L-capacity reaction vessel equipped with a stirrer, a reflux condenser, a dropping funnel, a thermometer and a nitrogen inlet tube was charged with 150 g of the resin a3 and 75 g of ethyl acetate, in which the contents were dissolved at 70° C. over 2 hours. The resulting solution was mixed with a 20% by mass ammonia aqueous solution (pKa: 9.3) in such a manner that the equivalent ratio of the basic substance relative to acid of the resin could be 0.40, and stirred for 30 minutes.

While kept at 70° C. with continuously stirring at 280 r/min (peripheral speed: 88 m/min), 675 g of ion-exchanged water was added to the solution over 77 minutes for phase inversion emulsification. While further kept at 70° C., ethyl acetate was evaporated away under reduced pressure. Subsequently, while kept stirred at 280 r/min (peripheral speed: 88 m/min), the aqueous dispersion was cooled to 30° C., and then 16.7 g of an anionic surfactant "EMAL E27C" available from Kao Corporation was mixed therein. Afterwards, the solid concentration in the dispersion was measured, and ion-exchanged water was added so that the resulting dispersion could have a solid concentration of 20% by mass to thereby give an aqueous dispersion a3-1 of binder resin composition particles dispersing therein. The mean particle size of the resulting dispersion was 140 nm.

[Production of Toner for Development of Electrostatic Images]

Melt-Kneading Method: Examples 1 to 17 and Comparative Examples 1 to 5

100 parts by mass of the binder resin shown in Table 3, 0.5 parts by mass of a negatively-chargeable charge controlling agent "BONTRONE E-84" available from Orient Chemical Industries Co., Ltd., 4 parts by mass of a copper phthalocyanine pigment "ECB-301" available from Dainichiseika Color & Chemicals Mfg. Co., Ltd., and wax (shown in Table) were added to a Henschel mixer and mixed therein for 5 minutes, and then the obtained mixture was melted and kneaded using a co-rotating twin screw extruder at a roll rotating speed of 200 r/min at a roll-inside heating temperature of 90° C. The resulting melt-kneaded material was cooled and coarsely pulverized, and then finely pulverized by a jet mill and classified, thereby giving toner base particles having a volume median diameter ($D_{50}$) shown in the Table.

1.0 part by mass of a hydrophobic silica "NAX-50" (hydrophobic treatment agent: HMDS; average particle size: 30 nm) available from Nippon Aerosil Co., Ltd., was added to 100 parts by mass of the thus obtained toner particles, and the resulting mixture was mixed by a Henschel mixer, thereby giving a toner. The toner was tested, and the test results are shown in Table 3.

Emulsification and Aggregation Method: Example 18

180 g of the aqueous dispersion A-1, 120 g of the aqueous dispersion a3-1, 8 g of the colorant dispersion, 10 g of the releasing agent dispersion, 2 g of the charge controlling agent dispersion, and 52 g of deionized water were put into a 3 liter-capacity vessel, and with stirring with an anchor-type stirrer at 100 r/min (peripheral speed 31 m/min) and at 20° C., 150 g of an aqueous 0.1% by mass calcium chloride solution as dropwise added thereto over 30 minutes. Subsequently, this was heated to 40° C. with stirring. This was kept at 40° C. until the volume median diameter ($D_{50}$) thereof could reach 6.5 µm. At the time after 4 hours, the volume median diameter ($D_{50}$) reached 6.5 µm.

Subsequently, a diluted solution prepared by diluting 4.2 g of an anionic surfactant "EMAL E27C" (available from Kao Corporation, solid content: 28% by mass) as an aggregation stopping agent, with 37 g of deionized water was added. Next, this was heated to 45° C. and then kept at 45° C. for further 1 hour, and thereafter the heating was stopped. With that, coalesced particles were formed, then gradually cooled to 20° C., filtered through a 150-mesh sire (opening 150 µm), further filtered through suction, washed and dried to give toner base particles.

1.0 part by mass of a hydrophobic silica "NAX-50" (hydrophobic treatment agent: HMDS; mean particle size: 30 nm) available from Nippon Aerosil Co., Ltd., was added to 100 parts by mass of the resulting toner base particles, and mixed by a Henschel mixer, thereby giving a toner. The toner was tested, and the test results are shown in Table 3.

TABLE 3

| | Binder Resin | | | | | | | | Evaluation | | |
| | Resin 1 | | Resin 2 | | Resin 3 | | Wax | | Fusion on PP (%) | Fusion on Paper (%) | Non-Offset Region (° C.) |
| | Binder Resin Composition | part by mass *1 | Kind | part by mass *1 | Kind | part by mass *1 | Kind | part by mass *1 | | | |
| Example 1 | A | 60 | a1 | 20 | a2 | 20 | WEP-9 | 5 | 98 | 100 | 60 |
| Example 2 | A | 60 | a1 | 20 | a2 | 20 | Carnauba | 5 | 98 | 100 | 60 |
| Example 3 | A | 60 | a1 | 20 | a2 | 20 | HNP-9 | 5 | 90 | 100 | 50 |
| Example 4 | A | 80 | a1 | 10 | a2 | 10 | WEP-9 | 5 | 98 | 97 | 50 |
| Example 5 | A | 100 | — | — | — | — | WEP-9 | 5 | 100 | 93 | 35 |

TABLE 3-continued

| | Binder Resin | | | | | | | | Evaluation | | |
|---|---|---|---|---|---|---|---|---|---|---|---|
| | Resin 1 | | Resin 2 | | Resin 3 | | Wax | | Fusion | Fusion | |
| | Binder Resin Composition | part by mass *1 | Kind | part by mass *1 | Kind | part by mass *1 | Kind | part by mass *1 | on PP (%) | on Paper (%) | Non-Offset Region (° C.) |
| Example 6 | A | 30 | a1 | 35 | a2 | 35 | WEP-9 | 5 | 76 | 100 | 60 |
| Example 7 | B | 60 | a1 | 20 | a2 | 20 | WEP-9 | 5 | 93 | 100 | 60 |
| Example 8 | C | 60 | a1 | 20 | a2 | 20 | WEP-9 | 5 | 75 | 100 | 60 |
| Comparative Example 1 | D | 60 | a1 | 20 | a2 | 20 | WEP-9 | 5 | 59 | 74 | 60 |
| Comparative Example 2 | E | 60 | a1 | 20 | a2 | 20 | WEP-9 | 5 | 47 | 100 | 60 |
| Example 9 | F | 60 | a1 | 20 | a2 | 20 | WEP-9 | 5 | 89 | 96 | 60 |
| Comparative Example 3 | G | 60 | a1 | 20 | a2 | 20 | WEP-9 | 5 | 53 | 92 | 60 |
| Example 10 | H | 60 | a1 | 20 | a2 | 20 | WEP-9 | 5 | 74 | 100 | 60 |
| Comparative Example 4 | I | 60 | a1 | 20 | a2 | 20 | WEP-9 | 5 | 25 | 100 | 60 |
| Example 11 | J | 60 | a1 | 20 | a2 | 20 | WEP-9 | 5 | 88 | 100 | 60 |
| Comparative Example 5 | K | 60 | a1 | 20 | a2 | 20 | WEP-9 | 5 | 53 | 100 | 60 |
| Example 12 | L | 60 | a1 | 20 | a2 | 20 | WEP-9 | 5 | 92 | 83 | 45 |
| Example 13 | M | 60 | a1 | 20 | a2 | 20 | WEP-9 | 5 | 81 | 100 | 60 |
| Example 14 | N | 60 | a1 | 20 | a2 | 20 | WEP-9 | 5 | 97 | 85 | 60 |
| Example 15 | O | 60 | a1 | 20 | a2 | 20 | WEP-9 | 5 | 96 | 100 | 60 |
| Example 16 | P | 60 | a1 | 20 | a2 | 20 | WEP-9 | 5 | 72 | 96 | 60 |
| Example 17 | Q | 60 | a1 | 20 | a2 | 20 | WEP-9 | 5 | 73 | 100 | 60 |
| Example 18 | A | 60 | a3 | 40 | | | HNP-9 | 3.7 | 95 | 94 | 45 |

The annotations with asterisks appearing in Table 3 have the following meanings.

*1: Blended amount (part by mass) relative to 100 parts by mass of the binder resin in the toner.

WEP-9: Synthetic ester wax (available from NOF, melting point: 72° C.)

Carnauba: Carnauba wax (trade name: Carnauba Wax C1 available from S. Kato & Co., melting point: 83° C.)

HNP-9: Paraffin wax (trade name: HNP-9 available from Nippon Seiro Co., Ltd., melting point: 75° C.)

As described above, and in comparison between Examples and Comparative Examples, it is known that, when the content of the small particle size component is 70% by mass or more and 100% by mass or less relative to the total amount of the large particle size component and the small particle size component in the polyolefin particles contained in the binder resin composition, and when the melting endothermic energy amount of the small particle size component is 3 J/g or more and 10 J/g or less, a toner excellent in fusing properties on paper and also in fusing properties on PP films can be obtained.

The invention claimed is:

1. A binder resin composition for toners for development of electrostatic images, comprising a polyester-based resin and polyolefin particles, wherein:
   the polyolefin particles comprise a polymer having a polymer skeleton of olefin having 2 or more and 3 or less carbon atoms,
   the volume median diameter ($D_{50}$) of a small particle size component, as measured according to a dynamic light scattering method using a dispersion S of a small particle size component obtainable according to the following Methods 1 and 2, is 20 nm or more and 400 nm or less,
   the content of a large particle size component obtainable according to Method 2 is more than 0% by mass and 30% by mass or less relative to the total amount of the large particle size component and the small particle size component, wherein volume median diameter ($D_{50}$) of the large particle size component as measured according to a dynamic light scattering method using a dispersion S of the large particle size component is 1 µm or more and 50 µm or less,
   the content of the small particle size component is 70% by mass or more and less than 100% by mass relative to the total amount of the large particle size component and the small particle size component, and
   the melting endothermic energy amount of the small particle size component is 3 J/g or more and 10 J/g or less,
   Method 1: 1 part by mass of the binder resin composition and 30 parts by mass of methyl ethyl ketone are stirred for 1 hour to prepare a dispersion H; and
   Method 2: after stirring to prepare the dispersion H according to Method 1, the dispersion is allowed to stand for 24 hours to precipitate a large particle size component, and the resulting supernatant solution is separated therefrom, thereby obtaining a dispersion S of a small particle size component.

2. The binder resin composition for toners for development of electrostatic images according to claim 1,
   wherein the content of the polyolefin particles is 3 parts by mass or more and 30 parts by mass or less relative to 100 parts by mass of the polyester-based resin.

3. The binder resin composition for toners for development of electrostatic images according to claim 1,
   wherein the content of the large particle size component is 1% by mass or more and 30% by mass or less relative to the total amount of the large particle size component and the small particle size component,
   the content of the small particle size component is 70% by mass or more and 99% by mass or less relative to the total amount of the large particle size component and the small particle size component, and
   the melting endothermic energy amount of the large particle size component is 40 J/g or more and 150 J/g or less.

4. The binder resin composition for toners for development of electrostatic images according to claim 1,
wherein the polyester-based resin comprises a composite resin comprising a polyester resin segment (A), a vinyl resin segment (B) comprising a constitutional unit derived from a vinyl monomer, and a constitutional unit derived from a bireactive monomer, and
the content molar ratio of the constitutional unit derived from the bireactive monomer is 0.001 mol/g or more and 0.10 mol/g, or less relative to the mass of the constitutional unit derived from the vinyl monomer the composite resin.

5. The binder resin composition for toners for development of electrostatic images according to claim 1, wherein the vinyl resin segment (B) comprises a constitutional unit derived from a vinyl monomer having an aliphatic hydrocarbon group having 6 or more and 22 or less carbon atoms in an amount of 8% by mass or more and 70% by mass or less.

6. A toner for development of electrostatic images, comprising the binder resin composition for toners for development of electrostatic images according to claim 1 in an amount of 20% by mass or more and 100% by mass or less relative to a binder resin present in the toner, and comprising a releasing agent having a melting point of 60° C. or higher and 100° C. or lower in an amount of 1.0 part by mass or more and 10 parts by mass or less relative to 100 parts by mass of the binder resin.

7. The toner for development of electrostatic images according to claim 6, which is a pulverized toner prepared according to a melt-kneading method.

8. A printing method, comprising printing on a plastic film according to an electrophotographic method with the toner for development of electrostatic images according to claim 6.

9. The printing method according to claim 8, wherein the plastic film is a polypropylene film.

10. A printed material, which is obtainable according to the method of claim 8.

* * * * *